(12) United States Patent
Liao et al.

(10) Patent No.: US 9,846,959 B2
(45) Date of Patent: Dec. 19, 2017

(54) APPARATUS AND METHOD FOR CONTROLLING EARLY DEPTH PROCESSING AND POST DEPTH PROCESSING

(71) Applicant: MEDIATEK INC., Hsin-Chu (TW)

(72) Inventors: Ming-Hao Liao, Hsinchu (TW); Tsung-Liang Hou, Hsinchu (TW); Chin-Yuan Yao, Hsinchu (TW); Hung-Wei Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 30 days.

(21) Appl. No.: 14/642,763

(22) Filed: Mar. 10, 2015

(65) Prior Publication Data
US 2016/0005208 A1    Jan. 7, 2016

Related U.S. Application Data

(60) Provisional application No. 62/020,412, filed on Jul. 3, 2014.

(51) Int. Cl.
*G06T 15/40* (2011.01)
*G06T 15/00* (2011.01)

(52) U.S. Cl.
CPC .......... *G06T 15/005* (2013.01); *G06T 15/405* (2013.01)

(58) Field of Classification Search
None
See application file for complete search history.

(56) References Cited

U.S. PATENT DOCUMENTS

| | | | | |
|---|---|---|---|---|
| 8,207,975 | B1* | 6/2012 | Molnar | G06T 15/005 345/426 |
| 2007/0236495 | A1* | 10/2007 | Gruber | G06T 15/405 345/422 |

* cited by examiner

*Primary Examiner* — Xiao Wu
*Assistant Examiner* — Mohammad H Akhavannik
(74) *Attorney, Agent, or Firm* — Winston Hsu

(57) ABSTRACT

A depth processing apparatus includes a depth buffer, an early depth processing circuit, a post depth processing circuit, and a depth processing controller. The depth buffer stores depth information of a plurality of pixels of a screen space. The early depth processing circuit performs early depth processing based on at least a portion of the depth information before a pixel shading stage. The post depth processing circuit performs post depth processing based on at least a portion of the depth information after the pixel shading stage. The depth processing controller manages a plurality of dependency indication values corresponding to a plurality of sub-regions in the screen space, respectively, and configured to control a first pixel for undergoing at least one of the early depth processing and the post depth processing by referring a first dependency indication value of a first sub-region in which the first pixel is located.

14 Claims, 16 Drawing Sheets

APPARATUS AND METHOD FOR CONTROLLING EARLY DEPTH PROCESSING AND POST DEPTH PROCESSING

CROSS REFERENCE TO RELATED APPLICATIONS

This application claims the benefit of U.S. provisional application No. 62/020,412, filed on Jul. 3, 2014 and incorporated herein by reference.

BACKGROUND

The present invention relates to a graphics system, and more particularly, to an apparatus and method for controlling early depth processing and post depth processing.

As known in the art, graphics processing is typically carried out in a pipelined fashion, with multiple pipeline stages operating on the data to generate the final rendering output (e.g., a frame that is displayed). Many graphics processing pipelines now include one or more programmable processing stages, commonly referred to as "shaders", which execute programs to perform graphics processing operations to generate the desired graphics data. For example, the graphics processing pipeline may include a vertex shader and a pixel (fragment) shader. These shaders are programmable processing stages that may execute shader programs on input data values to generate a desired set of output data for being further processing by the rest of the graphics pipeline stages. The shaders of the graphics processing pipeline may share programmable processing circuitry, or may be distinct programmable processing units.

In addition to the vertex shader and the pixel shader, early depth (Early-Z) processing and post depth (Post-Z) processing are features supported by many graphics processing units (GPUs). The Early-Z processing stage is placed before a pixel shading stage in the pipeline, and the Post-Z processing stage is placed after the pixel shading stage in the pipeline. If one of the Early-Z processing and the Post-Z processing indicates that a pixel is behind a geometry (i.e., the pixel is invisible), the following processing of the pixel can be omitted to save the system resource. However, if a conventional GPU wants to use the Early-Z processing to remove invisible pixels before the invisible pixels enter the pixel shading stage, it must flush the pipeline when switching from the Post-Z processing to the Early-Z processing to maintain data coherency. Such "flush event" requires several waiting cycles and thus degrades the rendering performance.

SUMMARY

One of the objectives of the claimed invention is to provide an apparatus and method for controlling early depth processing and post depth processing.

According to a first aspect of the present invention, an exemplary depth processing apparatus is disclosed. The exemplary depth processing apparatus includes a depth buffer, an early depth processing circuit, a post depth processing circuit, and a depth processing controller. The depth buffer is configured to store depth information of a plurality of pixels of a screen space. The early depth processing circuit is configured to perform early depth processing based on at least a portion of the depth information in the depth buffer before a pixel shading stage. The post depth processing circuit is configured to perform post depth processing based on at least a portion of the depth information in the depth buffer after the pixel shading stage. The depth processing controller is configured to manage a plurality of dependency indication values corresponding to a plurality of sub-regions in the screen space, respectively, and configured to control a first pixel for undergoing at least one of the early depth processing and the post depth processing by referring a first dependency indication value of a first sub-region in which the first pixel is located, wherein each of the dependency indication values is configured to maintain data coherency between the early depth processing and the post depth processing of a corresponding sub-region in the screen space.

According to a second aspect of the present invention, an exemplary depth processing apparatus employed in a tile based rendering (TBR) system is disclosed. The exemplary depth processing apparatus includes a depth buffer, an early depth processing circuit, a post depth processing circuit, and a depth processing controller. The depth buffer is configured to store depth information of a plurality of pixels of a screen space. The early depth processing circuit is configured to perform early depth processing based on at least a portion of the depth information in the depth buffer before a pixel shading stage. The post depth processing circuit is configured to perform post depth processing based on at least a portion of the depth information in the depth buffer after the pixel shading stage. The depth processing controller is configured to dispatch primitives in a plurality of sub-regions of the screen space, wherein when dispatching of primitives in a first sub-region of the screen space needs to switch from dispatching of at least one primitive each categorized as a post depth processing primitive to dispatching of at least one primitive each categorized as an early depth processing primitive, the depth processing controller is configured to start dispatching primitives in a second sub-region of the screen space that is different from the first sub-region of the screen space.

According to a third aspect of the present invention, an exemplary depth processing method is disclosed. The exemplary depth processing method includes: storing depth information of a plurality of pixels of a screen space in a depth buffer; selectively performing early depth processing based on at least a portion of the depth information in the depth buffer before a pixel shading stage; selectively performing post depth processing based on at least a portion of the depth information in the depth buffer after the pixel shading stage; and managing a plurality of dependency indication values corresponding to a plurality of sub-regions in the screen space, respectively, and controlling a first pixel for undergoing at least one of the early depth processing and the post depth processing by referring a first dependency indication value of a first sub-region in which the first pixel is located, wherein each of the dependency indication values is configured to maintain data coherency between the early depth processing and the post depth processing of a corresponding sub-region in the screen space.

According to a fourth aspect of the present invention, an exemplary depth processing method employed in tile based rendering (TBR) is disclosed. The exemplary depth processing method includes: storing depth information of a plurality of pixels of a screen space in a depth buffer; selectively performing early depth processing based on at least a portion of the depth information in the depth buffer before a pixel shading stage; selectively performing post depth processing based on at least a portion of the depth information in the depth buffer after the pixel shading stage; and dispatching primitives in a plurality of sub-regions of the screen space, wherein when dispatching of primitives in a first sub-region of the screen space needs to switch from dispatching of at least one primitive each categorized as a post depth processing primitive to dispatching of at least one primitive each categorized as an early depth processing primitive, dispatching primitives in a second sub-region of the screen space is started, where the second sub-region of the screen space is different from the first sub-region of the screen space.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One technical feature of the present invention is to use dependency indication values (e.g., dependency counter values) corresponding to a plurality of sub-regions in a screen space, where each of the dependency indication values is configured to maintain data coherency between early depth (Early-Z) processing and post depth (Post-Z) processing of a corresponding sub-region in the screen space. Hence, in a case where a pixel belonging to a sub-region in the screen space is categorized as an early depth processing pixel, the early depth processing pixel does not need to wait for flush cycles if a dependency indication value of the sub-region indicates that there is no dependency between the early depth processing and post depth processing of the sub-region in the screen space. Another technical feature of the present invention is to control the primitive dispatching scheduling in a tile based rendering (TBR) system. Hence, when dispatching of primitives of one sub-region in a screen space is switched from dispatching of primitive(s) categorized as post depth processing primitive(s) to dispatching of primitive(s) categorized as early depth processing primitive(s), dispatching of primitives of another sub-region in the screen space is started to hide the waiting flush time in the primitive dispatching time. Further details of technical features of the present invention are described as below.

Figure 1:
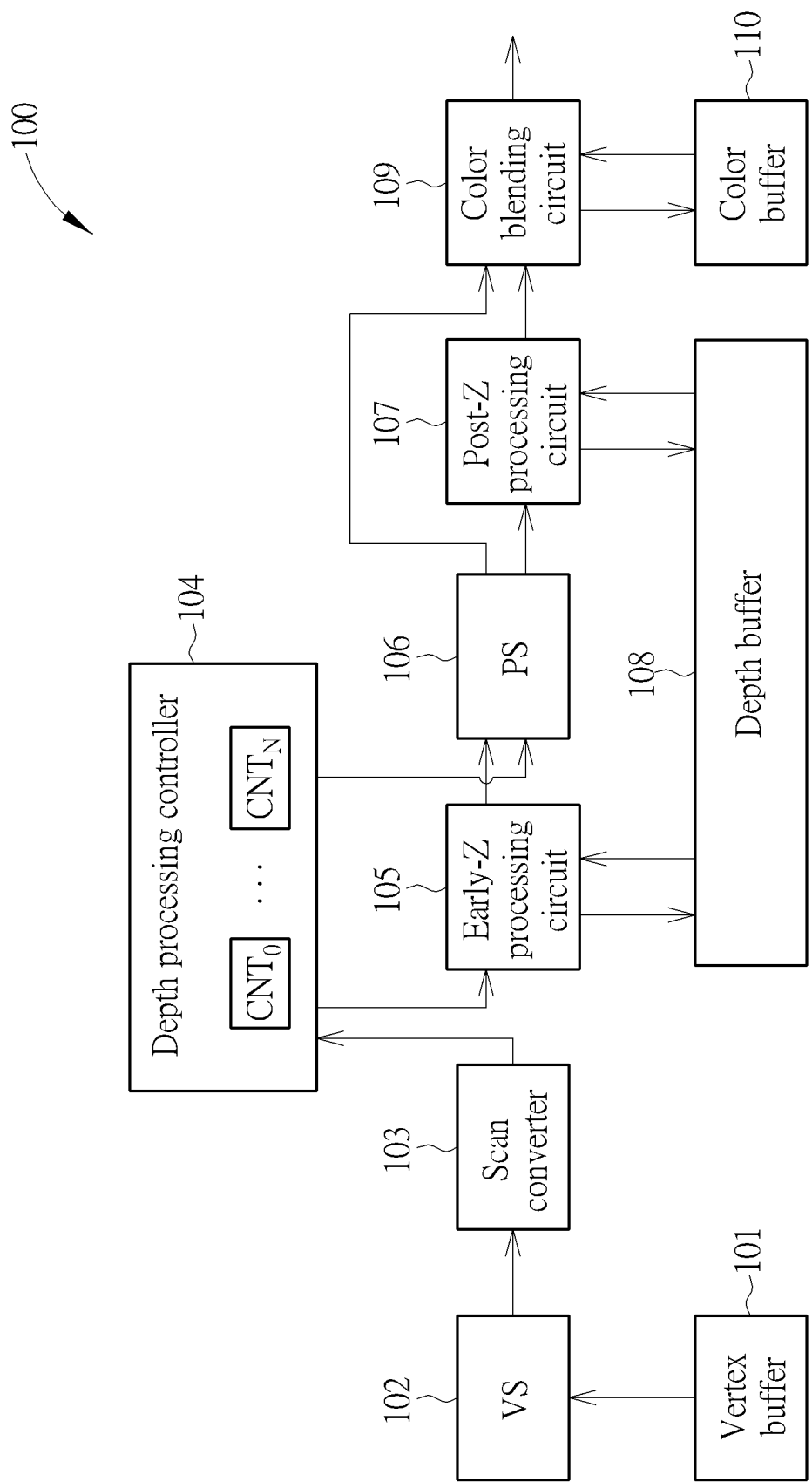
FIG. 1 is a diagram illustrating a first graphics processing system according to an embodiment of the present invention.

FIG. 1 is a diagram illustrating a first graphics processing system according to an embodiment of the present invention. The graphics processing system 100 includes a vertex buffer 101, a vertex shader 102, a scan converter 103, a depth processing controller 104, an early depth (Early-Z) processing circuit 105, a pixel shader 106, a post depth (Post-Z) processing circuit 107, a depth buffer 108, a color blending circuit 109, and a color buffer 110. The depth buffer 108 is configured to store depth information of a plurality of pixels of a screen space. More specifically, the depth buffer 108 stores a depth value for each pixel of the screen space. The early depth processing circuit 105 is configured to perform early depth processing based on at least a portion of the depth information in the depth buffer 108 before a pixel shading stage (which is implemented using the pixel shader 106). In this embodiment, the early depth processing is selectively performed based on a processing type of a pixel that is determined by the depth processing controller 104. The post depth processing circuit 107 is configured to perform post depth processing based on at least a portion of the depth information in the depth buffer 108 after the pixel shading stage (which is implemented using the pixel shader 106). In this embodiment, the post depth processing is selectively performed based on a processing type of a pixel that is determined by the depth processing controller 104. As operational principles of other circuit elements (e.g., vertex shader 102, scan converter 103, pixel shader 106, color blending circuit 109, etc.) in the graphics processing system 100 are known by those skilled in the art, further description is omitted here for brevity.

It should be noted that vertex shader 102, scan converter 103, depth processing circuit 104, early depth processing circuit 105, pixel shader 106, post depth processing circuit 107, and color blending circuit 109 may share processing circuitry (e.g., a processor running program codes), or may be implemented using distinct processing units. In addition, vertex buffer 101, depth buffer 108, and color buffer 110 may be allocated within the same memory device or may be implemented using distinct memory devices.

When receiving an input pixel generated from the scan converter 103 and categorized as an early depth processing pixel, the early depth processing circuit 105 reads a depth value corresponding to a screen space location where the input pixel is located from the depth buffer 108, and performs a depth test upon the input pixel by comparing a depth value of the input pixel with the stored depth value read from the depth buffer 108. When the comparison result indicates that the input pixel is closer to the viewer (e.g., the depth value of the input pixel is smaller than the stored depth value read from the depth buffer 108), the input pixel passes the depth test. Hence, the early depth processing circuit 105 outputs the input pixel to the next pipeline stage (e.g., the pixel shader 106), and further performs a depth updating operation to store the depth value of the input pixel into the depth buffer 108 to update/modify the stored depth value corresponding to the screen space location where the input pixel is located. However, when the comparison result indicates that the input pixel is not closer to the viewer (e.g., the depth value of the input pixel is not smaller than the stored depth value read from the depth buffer 108), the input pixel fails to pass the depth test due to the fact that the input pixel is occluded by other geometry. Hence, the early depth processing circuit 105 discards the input pixel without forwarding the input pixel to the next pipeline stage (e.g., the pixel shader 106), and performs no depth updating operation upon the stored depth value corresponding to the screen space location where the input pixel is located.

When receiving an input pixel categorized as a post depth processing pixel and processed by the pixel shader 106, the post depth processing circuit 107 reads a depth value corresponding to a screen space location where the input pixel is located from the depth buffer 108, and performs a depth test upon the input pixel by comparing a depth value of the input pixel with the stored depth value read from the depth buffer 108. When the comparison result indicates that the input pixel is closer to the viewer (e.g., the depth value of the input pixel is smaller than the stored depth value read from the depth buffer 108), the input pixel passes the depth test. Hence, the post depth processing circuit 107 outputs the input pixel to the next pipeline stage (e.g., the color blending circuit 109), and further performs a depth updating operation to store the depth value of the input pixel into the depth buffer 108 to update/modify the stored depth value corresponding to the screen space location where the input pixel is located. However, when the comparison result indicates that the input pixel is not closer to the viewer (e.g., the depth value of the input pixel is not smaller than the stored depth value read from the depth buffer 108), the input pixel fails to pass the depth test due to the fact that the input pixel is occluded by other geometry. Hence, the post depth processing circuit 107 discards the input pixel without forwarding the input pixel to the next pipeline stage (e.g., the color blending circuit 109), and performs no depth updating operation upon the stored depth value corresponding to the screen space location where the input pixel is located.

In this embodiment, the depth processing controller 104 may categorize each pixel generated from the scan converter (or called "rasterizer") 103 into either an early depth processing pixel or a post depth processing pixel. For example, the depth processing controller 104 may employ the following formula to calculate a parameter PostZPixel.

$$\text{PostZPixel} = (\text{DepthWriteEnable} \| \text{StencilWriteEnable}) \&\& (\text{Alpha\_Test\_Enable} \| \text{Shader\_TexKill} \| \text{Shader\_OutputDepth})$$

Hence, when at least one of a depth buffer write function and a stencil buffer write function is enabled and at least one of a pixel shader alpha test function, a pixel shader texkill function, and a pixel shader output depth function is enabled, PostZPixel=1, meaning that a depth value of a pixel can be confirmed only after the pixel shading is done; otherwise, PostZPixel=0, meaning that a depth value of a pixel can be confirmed before the pixel shading is performed. In other words, if PostZPixel=1, the depth processing controller 104 may treat the pixel as a post depth processing pixel; and if PostZPixel=0, the depth processing controller 104 may treat the pixel as an early depth processing pixel.

Figure 2:
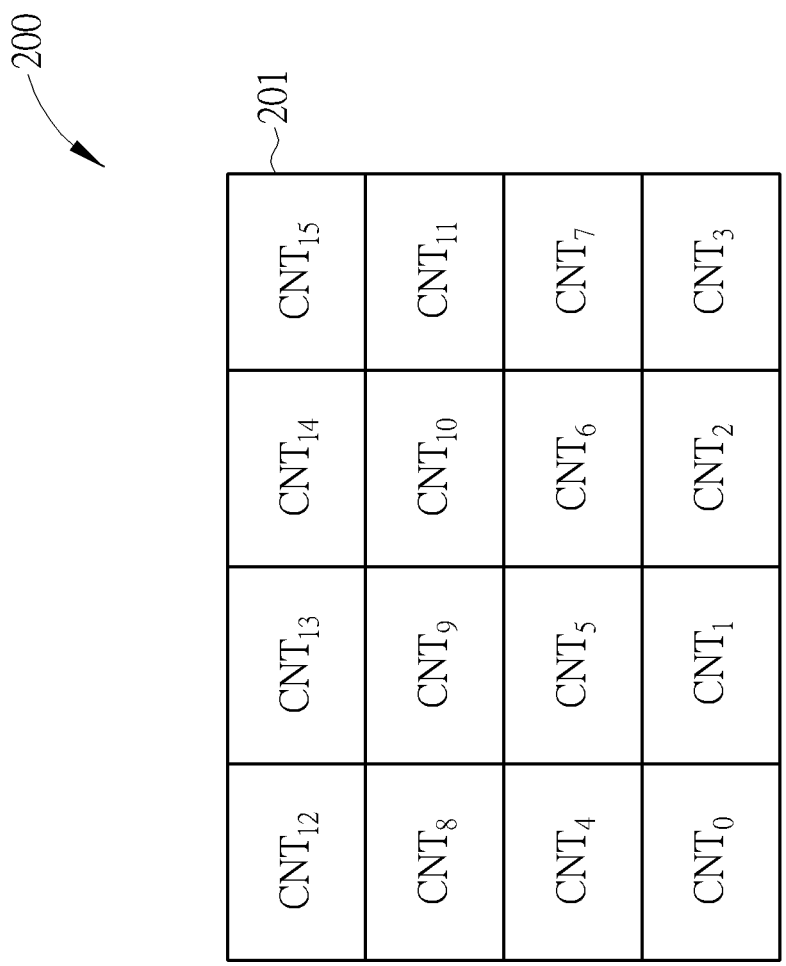
FIG. 2 is a diagram illustrating an example of dividing a screen space into a plurality of sub-regions according to an embodiment of the present invention.

To shorten the waiting flush time needed for switching from post depth processing to early depth processing, the present invention proposes using the depth processing controller 104 to manage a plurality of dependency indication values $CNT_0$-$CNT_N$ corresponding to a plurality of sub-regions in the screen space, respectively. FIG. 2 is a diagram illustrating an example of dividing a screen space into a plurality of sub-regions according to an embodiment of the present invention. For clarity and simplicity, it is assumed that the screen space 200 is divided into 16 sub-regions 201. It should be noted that the number of sub-regions and sizes of sub-regions as shown in FIG. 2 are for illustrative purposes only, and are not meant to be limitations of the present invention. In practice, the number of sub-regions and sizes of sub-regions can be adjusted, depending upon actual design consideration. For example, the size of each sub-region may be 2×2. That is, each sub-region includes 2×2 pixels in the screen space.

Further, the depth processing controller 104 maintains one dependency indication value for each of the sub-regions 201. As shown in FIG. 2, there are dependency indication values $CNT_0$-$CNT_{15}$ assigned to the sub-regions 201, respectively, where each of the dependency indication values $CNT_0$-$CNT_{15}$ is used to maintain data coherency between early depth processing and post depth processing for a corresponding sub-region in the screen space 200. In this embodiment, each of the dependency indication values $CNT_0$-$CNT_{15}$ indicates whether an early depth processing pixel located within the corresponding sub-region in the screen space 200 is allowed to be immediately processed by the early depth processing circuit 105 without waiting for completion of pipeline flush of the corresponding sub-region.

In one exemplary design, the dependency indication values $CNT_0$-$CNT_{15}$ may be implemented using dependency counter values. At the beginning of performing depth processing for pixels belonging to the same frame to be displayed on the screen space, each of the dependency counter values $CNT_0$-$CNT_{15}$ is reset by an initial value (e.g., 0). When a specific pixel corresponding to a specific sub-region in the screen space is categorized as a post depth processing pixel, the depth processing controller 104 may be configured to add an adjustment value (e.g., +1) to a specific dependency indication value corresponding to the specific sub-region in response to the post depth processing performed upon the specific pixel, and subtract the adjustment value (e.g., +1) from the specific dependency indication value corresponding to the specific sub-region in response to a completion of the post depth processing performed upon the specific pixel.

However, when the specific pixel is categorized as an early depth processing pixel, the depth processing controller 104 may be configured to not adjust the specific dependency indication value in response to early depth processing performed upon the specific pixel. In other words, when a sub-region in the screen space has at least one pixel currently undergoing the post depth processing performed in the post depth processing circuit 107, a corresponding dependency counter value would be different from the initial value (e.g., 0), thus indicating that there is dependency between the post depth processing and the early depth processing; and when the sub-region in the screen space has no pixel currently undergoing the post depth processing performed in the post depth processing circuit 107, the corresponding dependency counter value would be equal to the initial value (e.g., 0), thus indicating that there is no dependency between the post depth processing and the early depth processing. Hence, the depth processing controller 104 may check the corresponding dependency counter value of the sub-region in the screen space to know the dependency status.

The depth processing controller 104 is configured to refer to the specific dependency indication value of the specific sub-region in which the specific pixel is located to control the specific pixel to undergo at least one of the early depth processing performed in the early depth processing circuit 105 and the post depth processing performed in the post depth processing circuit 107. With regard to the depth processing control of pixels categorized as dependency early depth processing pixels, the depth processing controller 104 may be configured to employ one of three proposed schemes detailed as below.

In a first exemplary design, a non-flush scheme is applied to dependency early depth processing pixels. When the specific pixel is categorized as an early depth processing pixel and the specific dependency indication value indicates that there is no dependency between the early depth processing and the post depth processing of the specific sub-region, the depth processing controller 104 may treat the specific pixel as a non-dependency early depth processing pixel, and may control the specific pixel to undergo the early depth processing only. When the specific pixel is categorized as an early depth processing pixel and the specific dependency indication value indicates that there is dependency between the early depth processing and the post depth processing of the specific sub-region, the depth processing controller 104 may treat the specific pixel as a dependency early depth processing pixel, and may control the specific pixel to undergo at least the post depth processing. When the specific pixel is categorized as a post depth processing pixel, the depth processing controller 104 may control the specific pixel to undergo at least the post depth processing, regardless of the specific dependency indication value.

Figure 3:
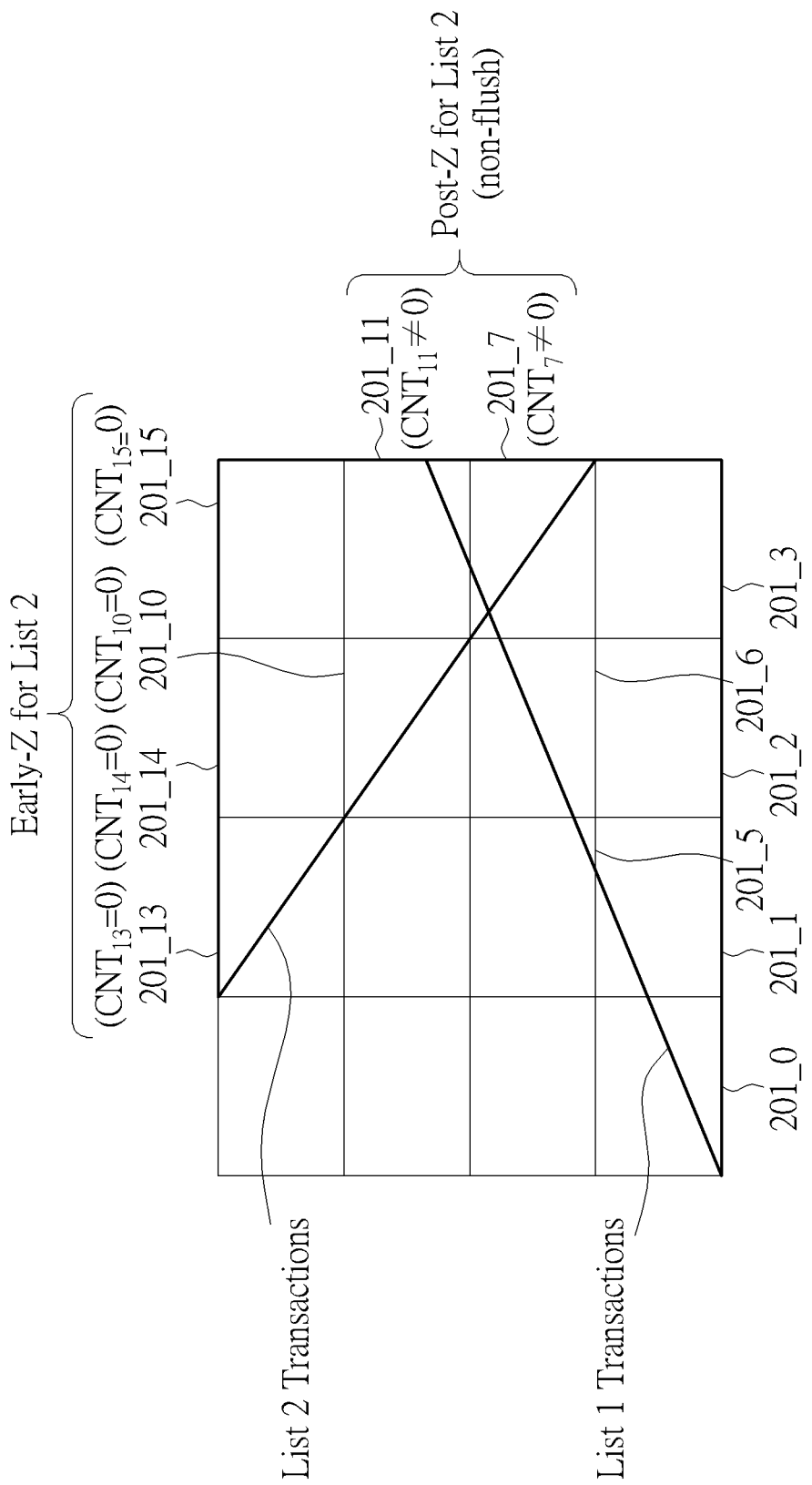
FIG. 3 is a diagram illustrating a first example of controlling pixels to undergo early depth processing and post depth processing.

FIG. 3 is a diagram illustrating a first example of controlling pixels to undergo early depth processing and post depth processing. In this example, let's assume that List 1 transactions are composed of pixels belonging to one triangle primitive and categorized as post depth processing pixels, and List 2 transactions following the List 1 transactions are composed of pixels belonging to another triangle primitive and categorized as early depth processing pixels. As shown in FIG. 3, sub-regions 201_0, 201_1, 201_2, 201_3, 201_5, 201_6, 201_7, and 201_11 may include pixels categorized as post depth processing pixels (List 1 transactions), and sub-regions 201_7, 201_10, 201_11, 201_13, 201_14, and 201_15 may include pixels categorized as early depth processing pixels (List 2 transactions). Hence, all of the post depth processing pixels (List 1 transactions) are controlled by the depth processing controller 104 to enter the pixel shader 106 and then processed by the post depth processing circuit 107. In a case where the post depth processing of post depth processing pixels belonging to the sub-regions 201_7 and 201_11 is not completed yet, the corresponding dependency indication values (e.g., dependency counter values) $CNT_7$ and $CNT_{11}$ are not equal to the initial values (e.g., 0's). Hence, the depth processing controller 104 treats early depth processing pixels located in the sub-regions 201_7 and 201_11 as dependency early depth processing pixels, and controls the dependency early depth processing pixels to undergo the post depth processing performed in the post depth processing circuit 107 without waiting for completion of pipeline flush of the sub-regions 201_7 and 201_11.

As shown in FIG. 3, the dependency indication values (e.g., dependency counter values) $CNT_{10}$, $CNT_{13}$, $CNT_{14}$, $CNT_{15}$ are equal to the initial values (e.g., 0's), the depth processing controller 104 therefore treats early depth processing pixels located in the sub-regions 201_10, 201_13, 201_14, and 201_15 as non-dependency early depth processing pixels, and controls the non-dependency early depth processing pixels to undergo the early depth processing performed in the early depth processing circuit 105, where none of the non-dependency early depth processing pixels needs to wait for completion of pipeline flush of a corresponding sub-region. No matter whether an early depth processing pixel is treated as a non-dependency early depth processing pixel or dependency early depth processing pixel, there is no waiting flush time is needed for switching from post depth processing to early depth processing.

Figure 4:
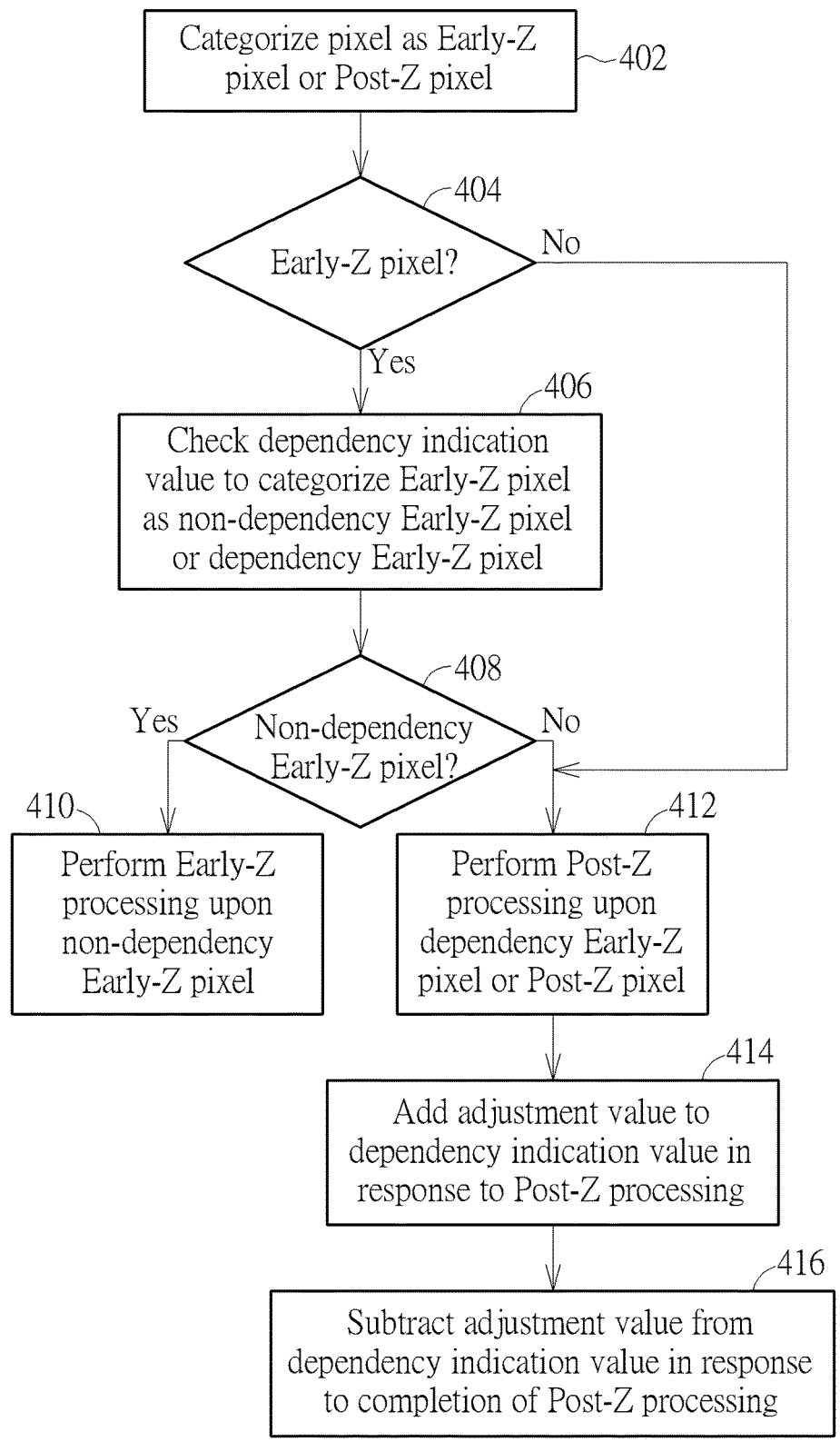
FIG. 4 is a flowchart illustrating one depth processing method according to an embodiment of the present invention.

FIG. 4 is a flowchart illustrating one depth processing method according to an embodiment of the present invention. Provided that the result is substantially the same, the steps are not required to be executed in the exact order shown in FIG. 4. The depth processing method applies the proposed non-flush scheme to dependency early depth processing pixels, and may be briefly summarized as below.

Step 402: Categorize a pixel as an early depth processing pixel or a post depth processing pixel.

Step 404: Check if the pixel is categorized as the early depth processing pixel. If yes, go to step 406; otherwise, go to step 412.

Step 406: Check a dependency indication value (e.g., a dependency counter value) of a sub-region where the pixel is located to categorize the early depth processing pixel as a non-dependency early depth processing pixel or a dependency early depth processing pixel.

Step 408: Is the early depth processing pixel categorized as the non-dependency early depth processing pixel. If yes, go to step 410; otherwise, go to step 412.

Step 410: Perform early depth processing upon the pixel categorized as the non-dependency early depth processing pixel, where the dependency indication value (e.g., the dependency counter value) is not adjusted in response to the early depth processing performed upon the pixel.

Step 412: Perform post depth processing upon the pixel categorized as the dependency early depth processing pixel or the post depth processing pixel.

Step 414: Add an adjustment value to the dependency indication value in response to the post depth processing performed upon the pixel.

Step 416: Subtract the adjustment value from the dependency indication value in response to a completion of the post depth processing performed upon the pixel.

As a person skilled in the art can readily understand details of each step shown in FIG. 4 after reading above paragraphs, further description is omitted here for brevity.

In a second exemplary design, a partial flush scheme is applied to dependency early depth processing pixels, and the early depth processing circuit 105 is configured to apply early depth processing to pixels in order. When the specific pixel is categorized as an early depth processing pixel and the specific dependency indication value indicates that there is no dependency between the early depth processing and the post depth processing of the specific sub-region, the depth processing controller 104 may treat the specific pixel as a non-dependency early depth processing pixel, and may control the specific pixel to undergo the early depth processing only. When the specific pixel is categorized as an early depth processing pixel and the specific dependency indication value indicates that there is dependency between the early depth processing and the post depth processing of the specific sub-region, the depth processing controller may treat the specific pixel as a dependency early depth processing pixel, and may control the specific pixel to wait for the specific dependency indication value indicating that there is no dependency between the early depth processing and the post depth processing of the specific sub-region (i.e., wait for completion of pipeline flush of the specific sub-region), where the specific pixel dose not undergo the early depth processing until the specific dependency indication value indicates that there is no dependency between the early depth processing and the post depth processing of the specific sub-region.

Figure 5:
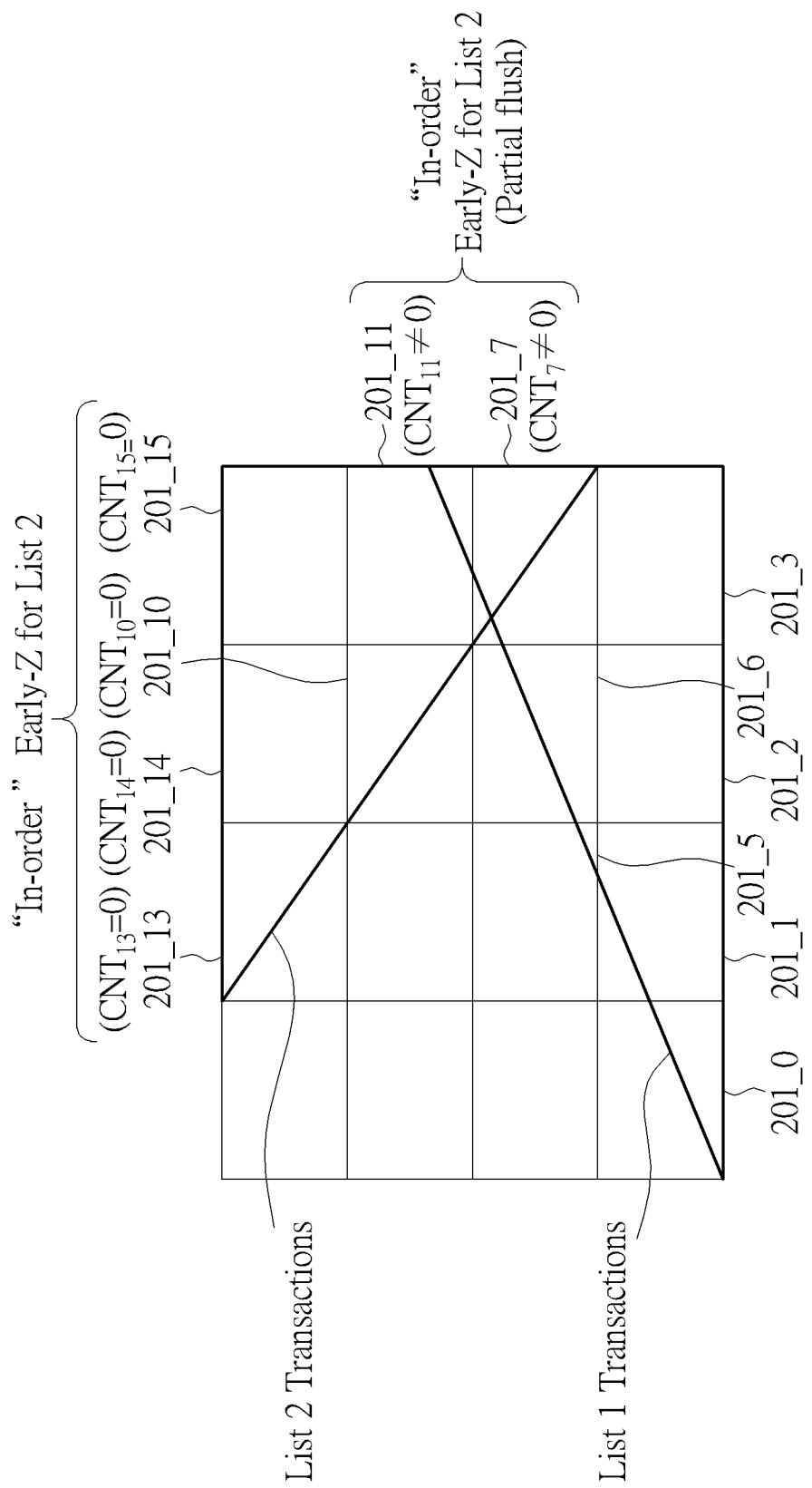
FIG. 5 is a diagram illustrating another example of controlling pixels to undergo early depth processing and post depth processing.

FIG. 5 is a diagram illustrating another example of controlling pixels to undergo early depth processing and post depth processing. In this example, let's assume that List 1 transactions are composed of pixels belonging to one triangle primitive and categorized as post depth processing pixels, and List 2 transactions following the List 1 transactions are composed of pixels belonging to another triangle primitive and categorized as early depth processing pixels. As shown in FIG. 5, sub-regions 201_0, 201_1, 201_2, 201_3, 201_5, 201_6, 201_7, and 201_11 may include pixels categorized as post depth processing pixels (List 1 transactions), and sub-regions 201_7, 201_10, 201_11, 201_13, 201_14, and 201_15 may include pixels categorized as early depth processing pixels (List 2 transactions). Hence, all of the post depth processing pixels (List 1 transactions) are controlled by the depth processing controller 104 to enter the pixel shader 106 and then processed by the post depth processing circuit 107. In a case where the post depth processing of post depth processing pixels belonging to the sub-regions 201_7 and 201_11 is not completed yet, the corresponding dependency indication values (e.g., dependency counter values) $CNT_7$ and $CNT_{11}$ are not equal to the initial values (e.g., 0's). Hence, the depth processing controller 104 treats early depth processing pixels located in the sub-regions 201_7 and 201_11 as dependency early depth processing pixels, and controls the dependency early depth processing pixels to wait for the corresponding dependency indication values (e.g., dependency counter values) $CNT_7$ and $CNT_{11}$ equal to the initial values (e.g., 0's) (i.e., wait for completion of pipeline flush of the corresponding sub-region).

As shown in FIG. 5, the dependency indication values (e.g., dependency counter values) $CNT_{10}$, $CNT_{13}$, $CNT_{14}$, $CNT_{15}$ are equal to the initial values (e.g., 0's), the depth processing controller 104 therefore treats early depth processing pixels located in the sub-regions 201_10, 201_13, 201_14, and 201_15 as non-dependency early depth processing pixels, and controls the non-dependency early depth processing pixels to undergo the early depth processing performed in the early depth processing circuit 105, where none of the non-dependency early depth processing pixels needs to wait for completion of pipeline flush of a corresponding sub-region. In this example, only a portion of the early depth processing pixels (i.e., dependency early depth processing pixels) requires the waiting flush time for switching from the post depth processing to the early depth processing.

In this example, the early depth processing pixels sequentially fed into the early depth processing circuit 105 are processed in order. For example, let's consider a case where the scan converter 103 outputs a first pixel and a second pixel sequentially (i.e., the first pixel is immediately followed by the second pixel), and the depth processing controller 104 categorizes the first pixel as a dependency early depth processing pixel and categorizes the second pixel as a non-dependency early depth processing pixel. The depth processing controller 104 controls each of the first pixel and the second pixel to undergo the early depth processing, such that the first pixel and the second pixel are fed into the early depth processing circuit 105 sequentially. The early depth processing circuit 105 is configured to process the first pixel and the second pixel in order. In other words, the early depth processing circuit 105 does not apply early depth processing to the second pixel until early depth processing of the first pixel is completed. Hence, the first pixel and the second pixel are sequentially processed by the early depth processing circuit 105 according to the input order.

Figure 6:
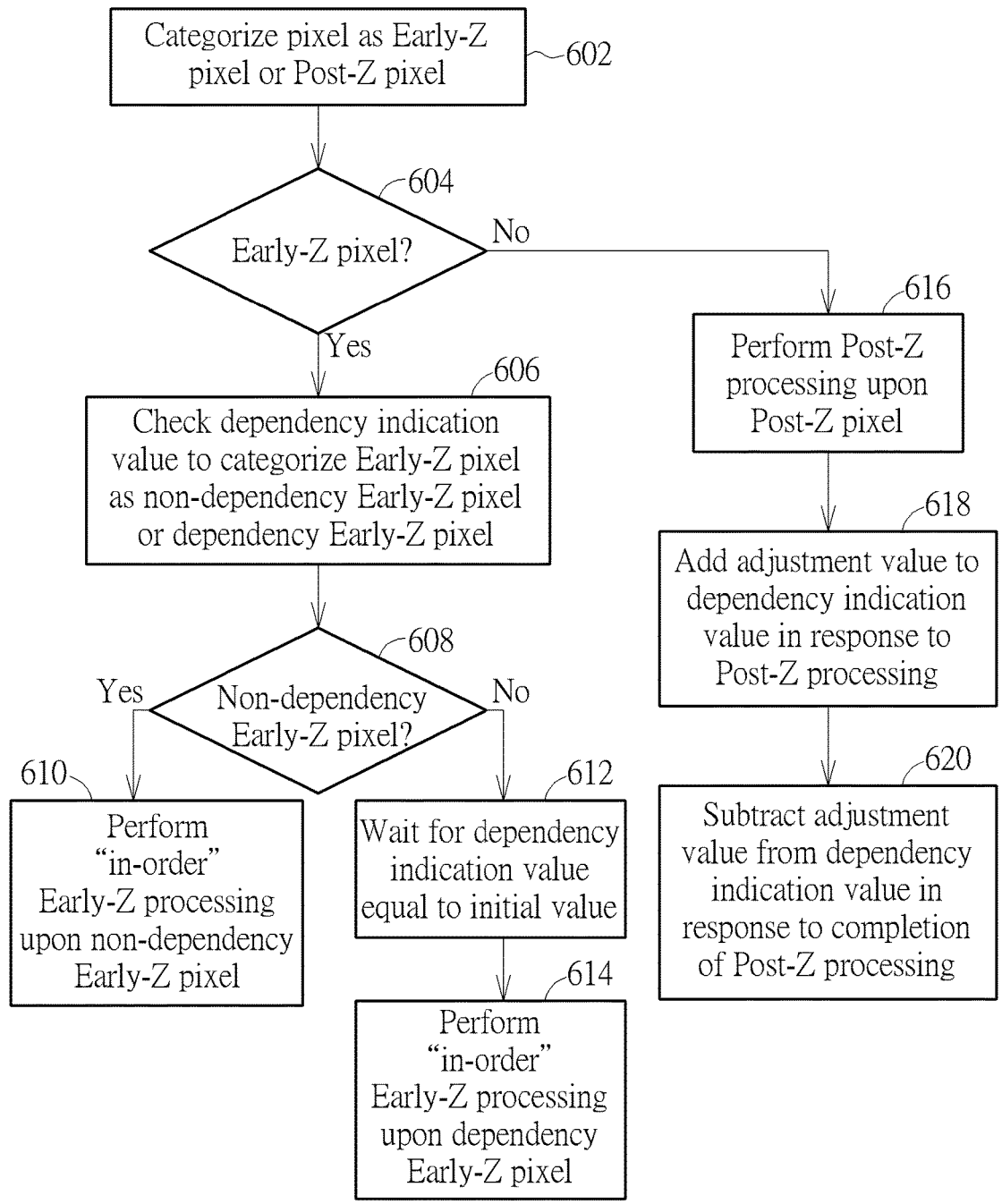
FIG. 6 is a flowchart illustrating a second depth processing method according to an embodiment of the present invention.

FIG. 6 is a flowchart illustrating a second depth processing method according to an embodiment of the present invention. Provided that the result is substantially the same, the steps are not required to be executed in the exact order shown in FIG. 6. The second depth processing method applies the proposed partial flush scheme to dependency early depth processing pixels under the condition that early depth processing pixels are processed by the early depth processing circuit 105 in order, and may be briefly summarized as below.

Step 602: Categorize a pixel as an early depth processing pixel or a post depth processing pixel.

Step 604: Check if the pixel is categorized as the early depth processing pixel. If yes, go to step 606; otherwise, go to step 616.

Step 606: Check a dependency indication value (e.g., a dependency counter value) of a sub-region where the pixel is located to categorize the early depth processing pixel as a non-dependency early depth processing pixel or a dependency early depth processing pixel.

Step 608: Is the early depth processing pixel categorized as the non-dependency early depth processing pixel. If yes, go to step 610; otherwise, go to step 612.

Step 610: Perform "in-order" early depth processing upon the pixel categorized as the non-dependency early depth processing pixel, where the dependency indication value (e.g., the dependency counter value) is not adjusted in response to the early depth processing performed upon the pixel.

Step 612: Wait for the dependency indication value equal to an initial value (e.g., 0).

Step 614: Perform "in-order" early depth processing upon the pixel categorized as the dependency early depth processing pixel, where the dependency indication value (e.g., the dependency counter value) is not adjusted in response to the early depth processing performed upon the pixel.

Step 616: Perform post depth processing upon the pixel categorized as the post depth processing pixel.

Step 618: Add an adjustment value to the dependency indication value in response to the post depth processing performed upon the pixel.

Step 620: Subtract the adjustment value from the dependency indication value in response to a completion of the post depth processing performed upon the pixel.

As a person skilled in the art can readily understand details of each step shown in FIG. 6 after reading above paragraphs, further description is omitted here for brevity.

Figure 7:
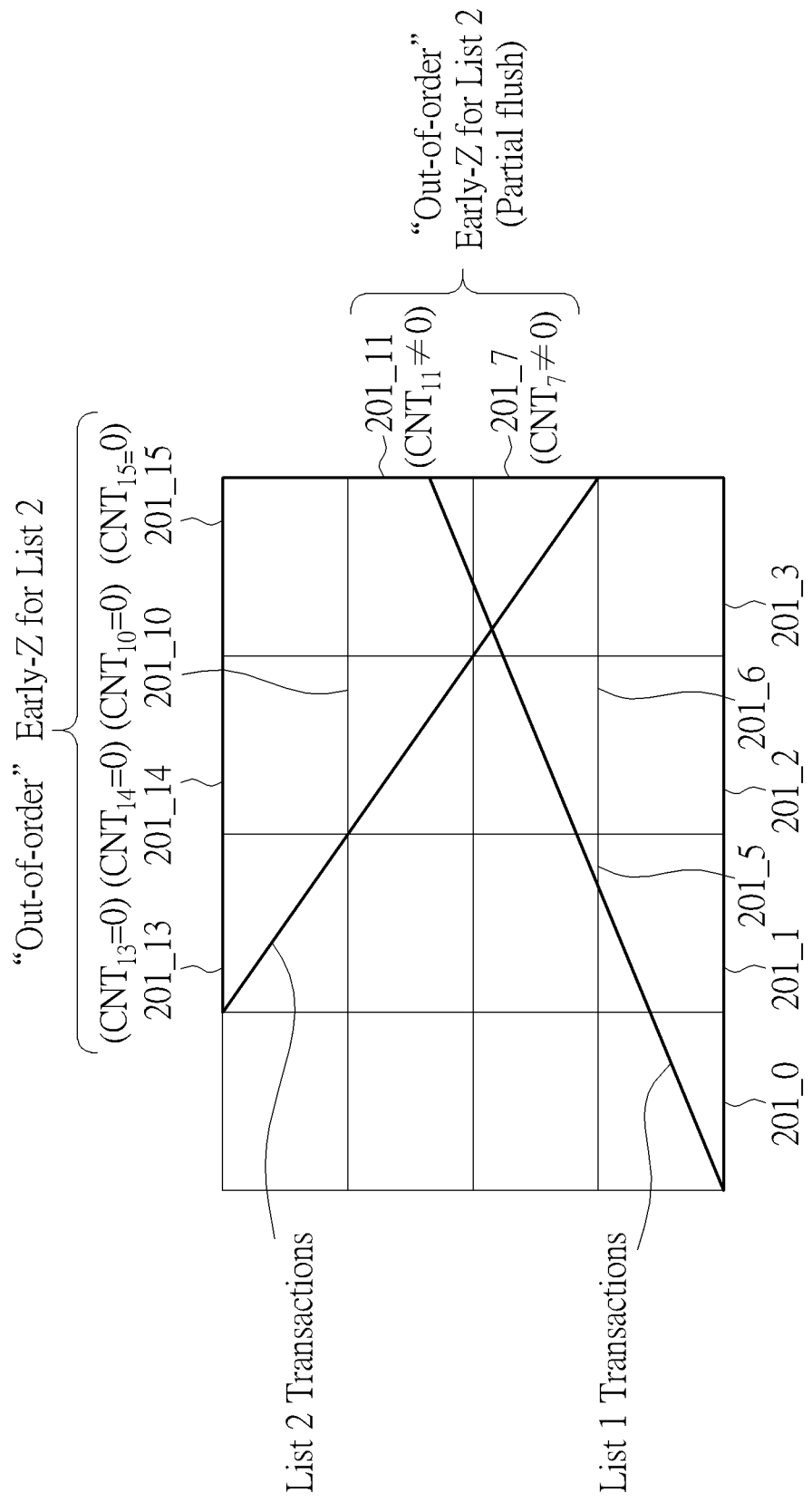
FIG. 7 is a diagram illustrating yet another example of controlling pixels to undergo early depth processing and post depth processing.

FIG. 7 is a diagram illustrating yet another example of controlling pixels to undergo early depth processing and post depth processing. The examples shown in FIG. 7 and FIG. 5 are similar, and the major difference therebetween is that the early depth processing circuit 105 in the example shown in FIG. 7 is configured to apply early depth processing to pixels in an out-of-order manner. In a case where the post depth processing of post depth processing pixels belonging to the sub-regions 201_7 and 201_11 is not completed yet, the corresponding dependency indication values (e.g., dependency counter values) $CNT_7$ and $CNT_{11}$ are not equal to the initial values (e.g., 0's). Hence, the depth processing controller 104 treats early depth processing pixels located in the sub-regions 201_7 and 201_11 as dependency early depth processing pixels, and controls the dependency early depth processing pixels to wait for the corresponding dependency indication values (e.g., dependency counter values) $CNT_7$ and $CNT_{11}$ equal to the initial values (e.g., 0's) (i.e., wait for completion of pipeline flush of the corresponding sub-regions).

As shown in FIG. 7, the dependency indication values (e.g., dependency counter values) $CNT_{10}$, $CNT_{13}$, $CNT_{14}$, $CNT_{15}$ are equal to the initial values (e.g., 0's). The depth processing controller 104 therefore treats early depth processing pixels located in the sub-regions 201_10, 201_13, 201_14, 201_15 as non-dependency early depth processing pixels, and controls the non-dependency early depth processing pixels to undergo the early depth processing performed in the early depth processing circuit 105, where none of the non-dependency early depth processing pixels needs to wait for completion of pipeline flush of corresponding sub-regions. Similarly, only a portion of the early depth processing pixels (i.e., dependency early depth processing pixels) requires the waiting flush time for switching from the post depth processing to the early depth processing.

In this example, the early depth processing pixels sequentially fed into the early depth processing circuit 105 are allowed to be processed in an out-of-order manner. For example, let's consider a case where the scan converter 103 outputs a first pixel and a second pixel sequentially (i.e., the first pixel is immediately followed by the second pixel), and the depth processing controller 104 categorizes the first pixel as a dependency early depth processing pixel and categorizes the second pixel as a non-dependency early depth processing pixel. The depth processing controller 104 controls each of the first pixel and the second pixel to undergo the early depth processing, such that the first pixel and the second pixel are fed into the early depth processing circuit 105 sequentially. The early depth processing circuit 105 is configured to process the first pixel and the second pixel out of order. The first pixel categorized as the dependency early depth processing pixel needs one waiting flush time, but the second pixel categorized as the non-dependency early depth processing pixel does not need one waiting flush time. Applying "in-order" early depth processing to the first pixel and the second pixel may require a longer processing time. In this example, the early depth processing circuit 105 is allowed to start applying early depth processing to the second pixel before the early depth processing of the first pixel is completed. Hence, the first pixel and the second pixel are not sequentially processed by the early depth processing circuit 105 according to the input order.

Figure 8:
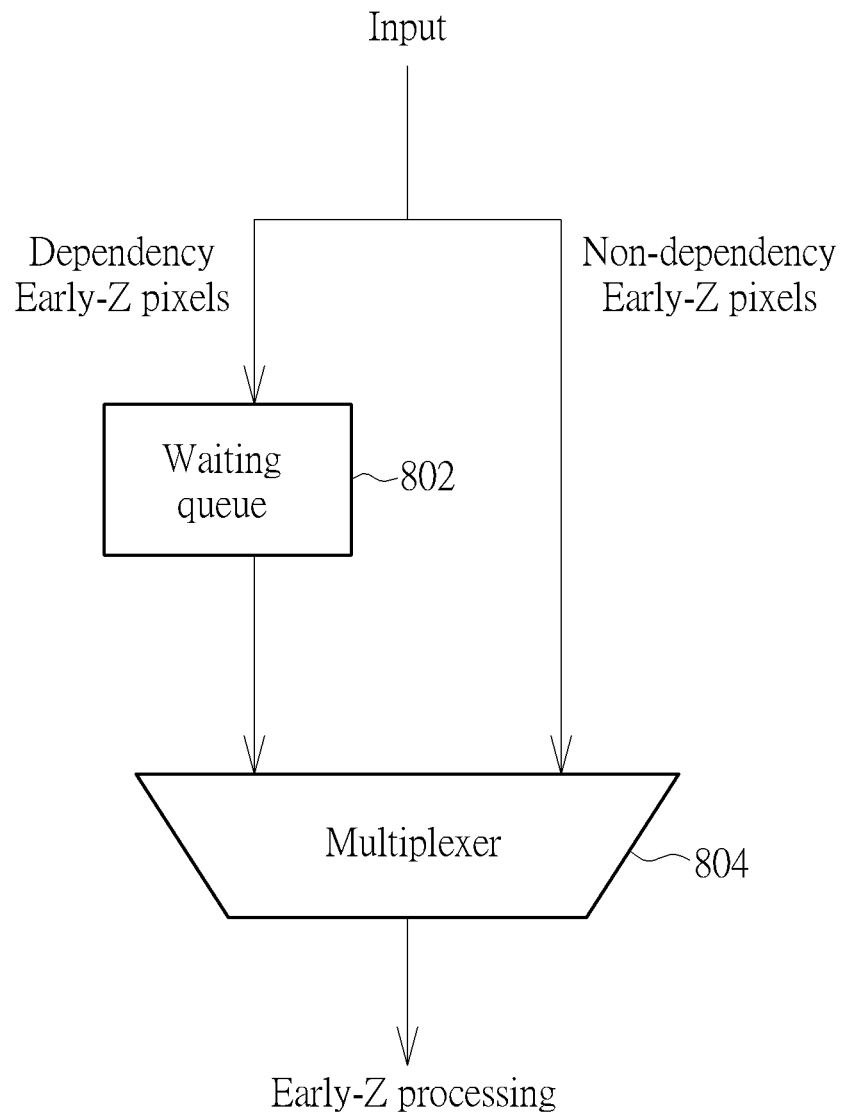
FIG. 8 is a diagram illustrating a portion of the early depth processing circuit that supports "out-of-order" early depth processing according to an embodiment of the present invention.

FIG. 8 is a diagram illustrating a portion of the early depth processing circuit 105 that supports "out-of-order" early depth processing according to an embodiment of the present invention. The early depth processing circuit 105 may have a waiting queue 802 and a multiplexer 804. The early depth processing pixels categorized as dependency early depth processing pixels based on the dependency indication values (e.g., dependency counter values) are pushed into the waiting queue 802, while early depth processing pixels categorized as non-dependency early depth processing pixels based on the dependency indication values (e.g., dependency counter values) are transmitted to the multiplexer 804 without pushed into the waiting queue 802. Hence, the sequence of early depth processing of the dependency early depth processing pixels and the non-dependency early depth processing pixels could be out of order.

Figure 9:
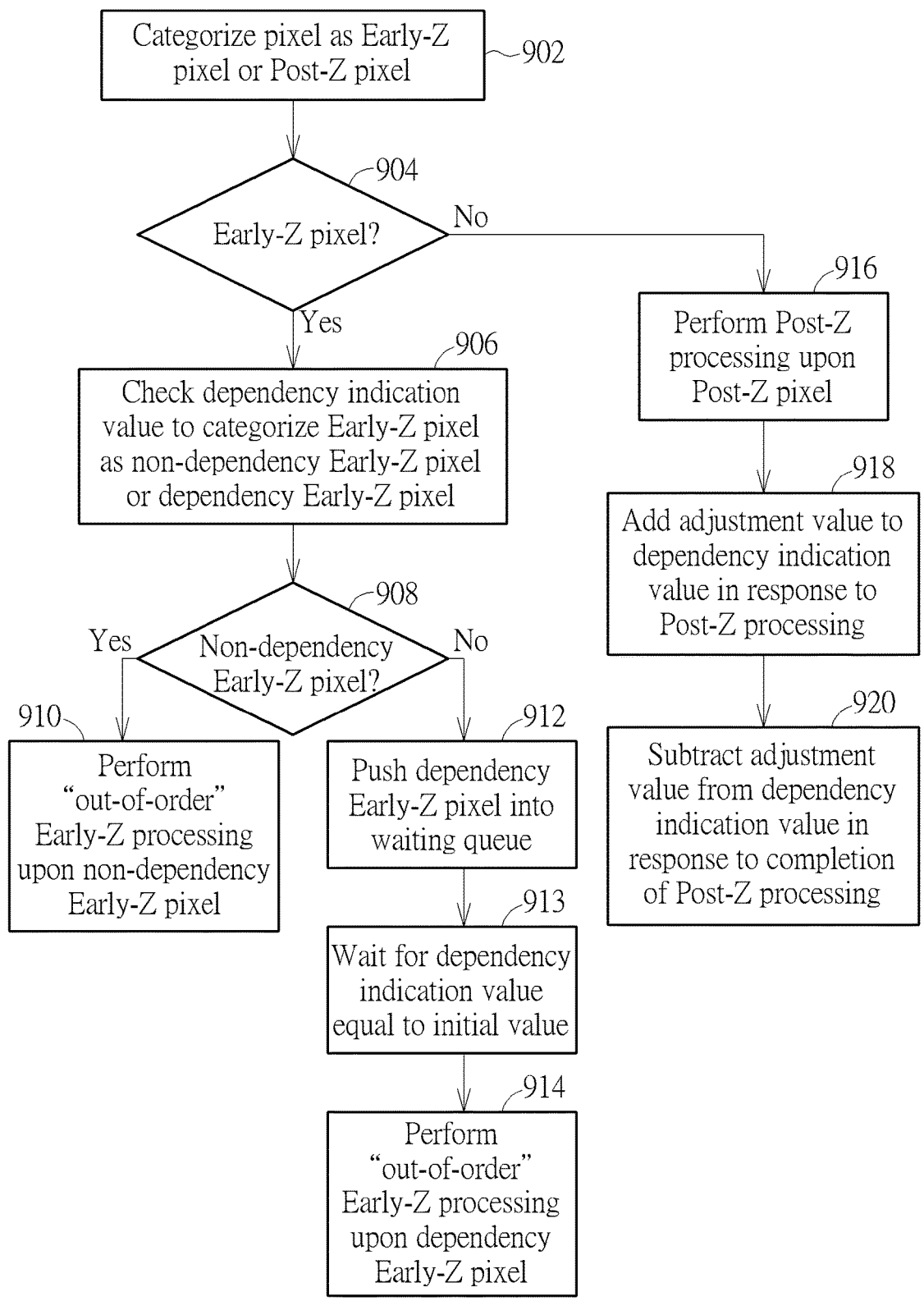
FIG. 9 is a flowchart illustrating a third depth processing method according to an embodiment of the present invention.

FIG. 9 is a flowchart illustrating a third depth processing method according to an embodiment of the present invention. Provided that the result is substantially the same, the steps are not required to be executed in the exact order shown in FIG. 9. The third depth processing method applies the proposed partial flush scheme to dependency early depth processing pixels under the condition that early depth processing pixels are processed by the early depth processing circuit 105 out of order, and may be briefly summarized as below.

Step 902: Categorize a pixel as an early depth processing pixel or a post depth processing pixel.

Step 904: Check if the pixel is categorized as the early depth processing pixel. If yes, go to step 906; otherwise, go to step 916.

Step 906: Check a dependency indication value (e.g., a dependency counter value) of a sub-region where the pixel is located to categorize the early depth processing pixel as a non-dependency early depth processing pixel or a dependency early depth processing pixel.

Step 908: Is the early depth processing pixel categorized as the non-dependency early depth processing pixel. If yes, go to step 910; otherwise, go to step 912.

Step 910: Perform "out-of-order" early depth processing upon the pixel categorized as the non-dependency early depth processing pixel, where the dependency indication value (e.g., the dependency counter value) is not adjusted in response to the early depth processing performed upon the pixel.

Step 912: Push the pixel categorized as the dependency early depth processing pixel into a waiting queue.

Step 913: Wait for the dependency indication value equal to an initial value (e.g., 0).

Step 914: Perform "out-of-order" early depth processing upon the pixel categorized as the dependency early depth processing pixel, where the dependency indication value (e.g., the dependency counter value) is not adjusted in response to the early depth processing performed upon the pixel.

Step 916: Perform post depth processing upon the pixel categorized as the post depth processing pixel.

Step 918: Add an adjustment value to the dependency indication value in response to the post depth processing performed upon the pixel.

Step 920: Subtract the adjustment value from the dependency indication value in response to a completion of the post depth processing performed upon the pixel.

As a person skilled in the art can readily understand details of each step shown in FIG. 9 after reading above paragraphs, further description is omitted here for brevity.

Figure 10:
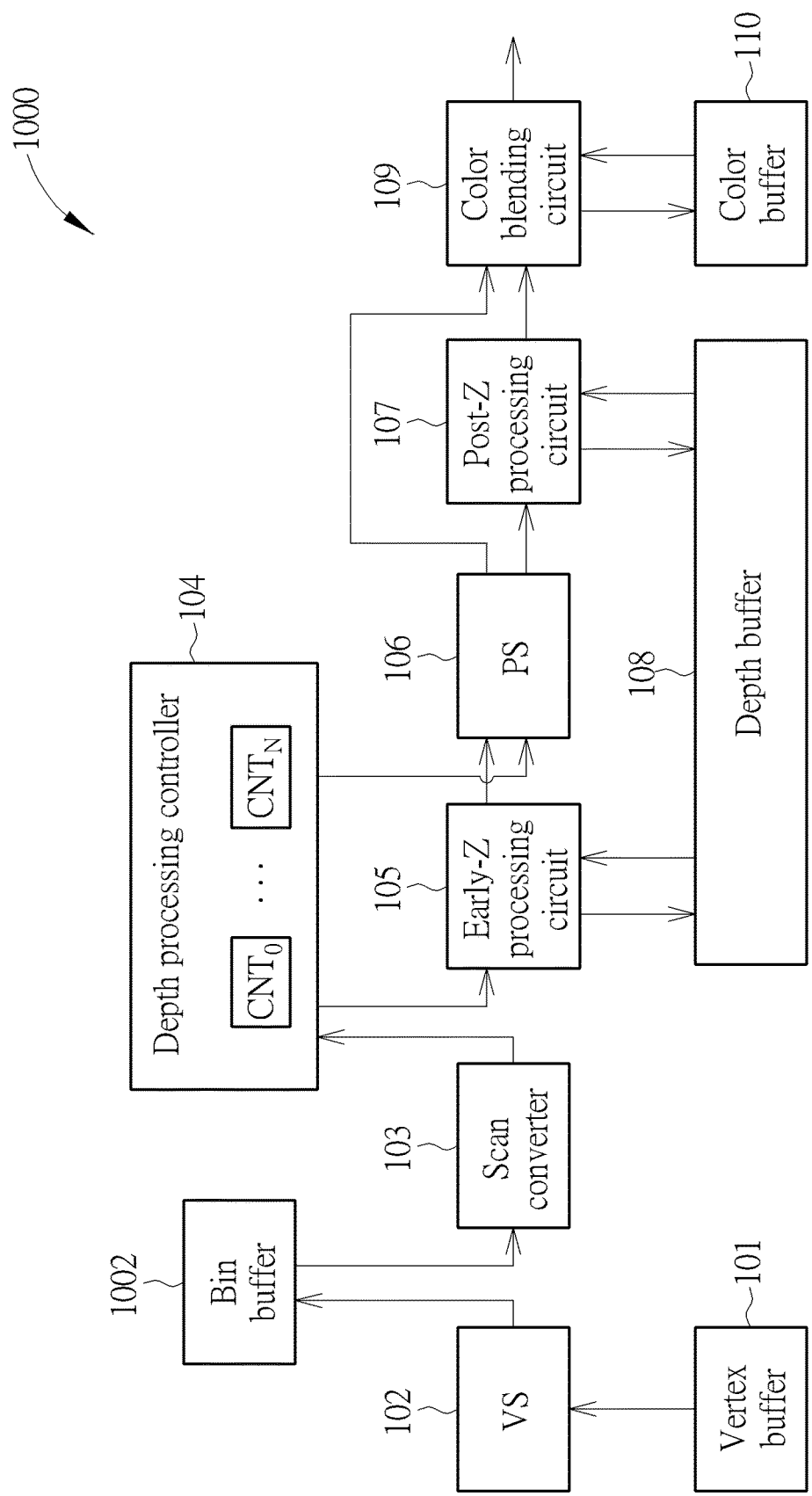
FIG. 10 is a diagram illustrating a second graphics processing system according to an embodiment of the present invention.

The same depth processing control mentioned above may also be employed by a tile based rendering (TBR) system. FIG. 10 is a diagram illustrating a second graphics processing system according to an embodiment of the present invention. Compared to the graphics processing system 100 shown in FIG. 1, the graphics processing system 1000 further includes a bin buffer 1002. It should be noted that vertex shader 102, scan converter 103, depth processing circuit 104, early depth processing circuit 105, pixel shader 106, post depth processing circuit 107, and color blending circuit 109 may share processing circuitry (e.g., a processor running program codes), or may be implemented using distinct processing units. In addition, vertex buffer 101, bin buffer 1002, depth buffer 108, and color buffer 110 may be allocated within the same memory device or may be implemented using distinct memory devices.

In this embodiment, the screen space may be divided into a plurality of tiles (or called bins), and the scan converter 103 is configure to process the bins one by one. Hence, the scan converter 103 outputs pixels belonging to one bin to the following pipeline stage, and then outputs pixels belonging to another bin to the following pipeline stage. For example, the sub-regions shown in FIG. 2 may be regarded as forming a specific bin of the screen space 200; the List 1 transactions shown in FIG. 3/FIG. 5/FIG. 7 may be regarded as pixels in the specific bin that are categorized as post depth processing pixels; and the List 2 transactions shown in FIG. 3/FIG. 5/FIG. 7 may be regarded as pixels in the specific bin that are categorized as early depth processing pixels. As a person skilled in the art can readily understand details of the depth processing control employed in a TBR system (i.e., graphics processing system 1000) after reading above paragraphs directed to the depth processing control employed in the graphics processing system 100, further description is omitted here for brevity.

Figure 11:
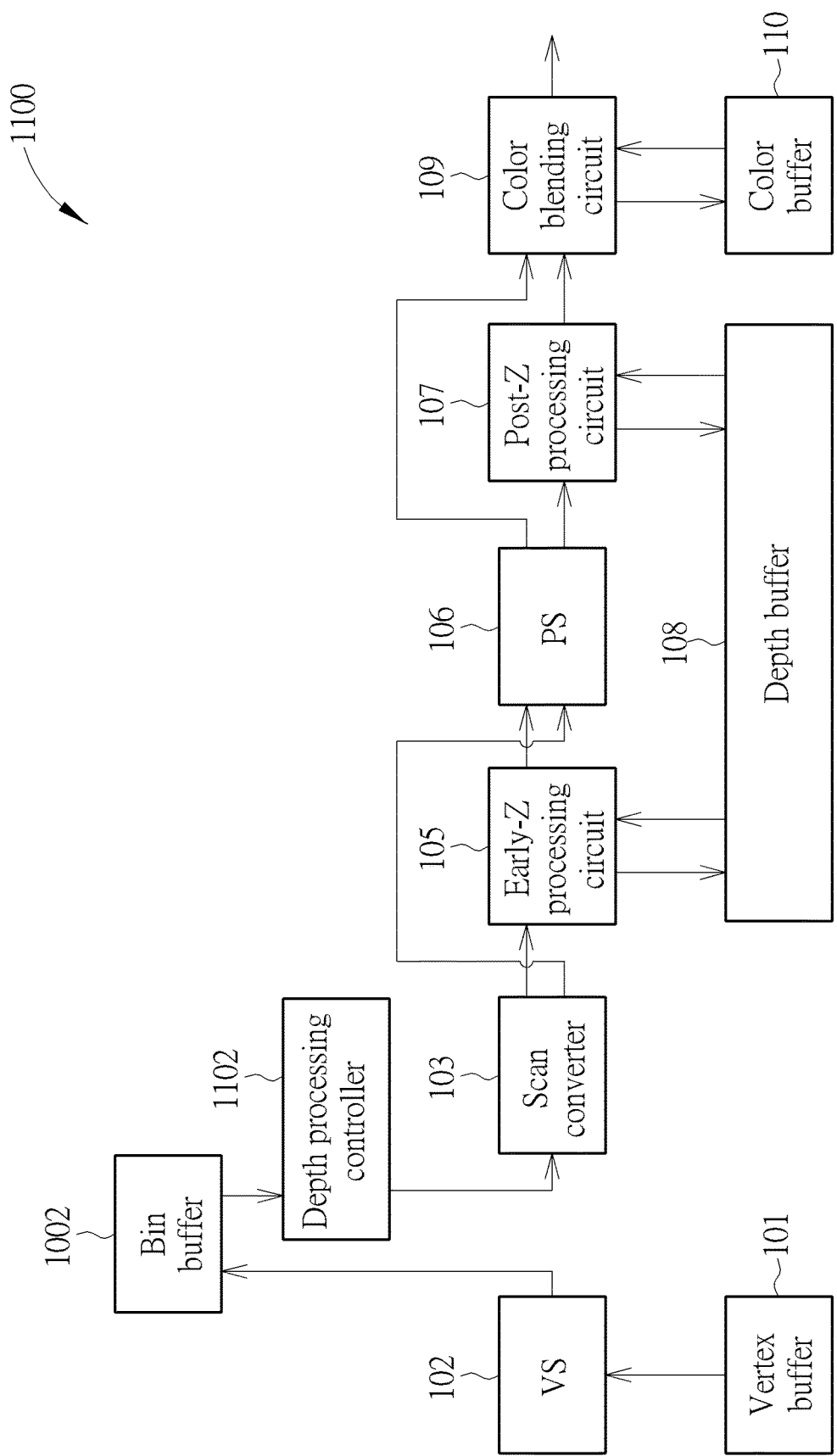
FIG. 11 is a diagram illustrating a third graphics processing system according to an embodiment of the present invention.

In above embodiments, the depth processing control scheme is applied to pixels generated from the scan converter 103. In an alternative embodiment, a modified depth processing control scheme may be applied to primitives processed and then output from a vertex shader. FIG. 11 is a diagram illustrating a third graphics processing system according to an embodiment of the present invention. The graphics processing system 1100 is a TBR system, and includes a depth processing controller 1102 and the aforementioned vertex buffer 101, vertex shader 102, bin buffer 1002, scan converter 103, early depth processing circuit 105, pixel shader 106, post depth processing circuit 107, depth buffer 108, color blending circuit 109, and color buffer 110. It should be noted that vertex shader 102, scan converter 103, depth processing circuit 1102, early depth processing circuit 105, pixel shader 106, post depth processing circuit 107, and color blending circuit 109 may share processing circuitry (e.g., a processor running program codes), or may be implemented using distinct processing units. In addition, vertex buffer 101, bin buffer 1002, depth buffer 108, and color buffer 110 may be allocated within the same memory device or may be implemented using distinct memory devices.

Figure 12:
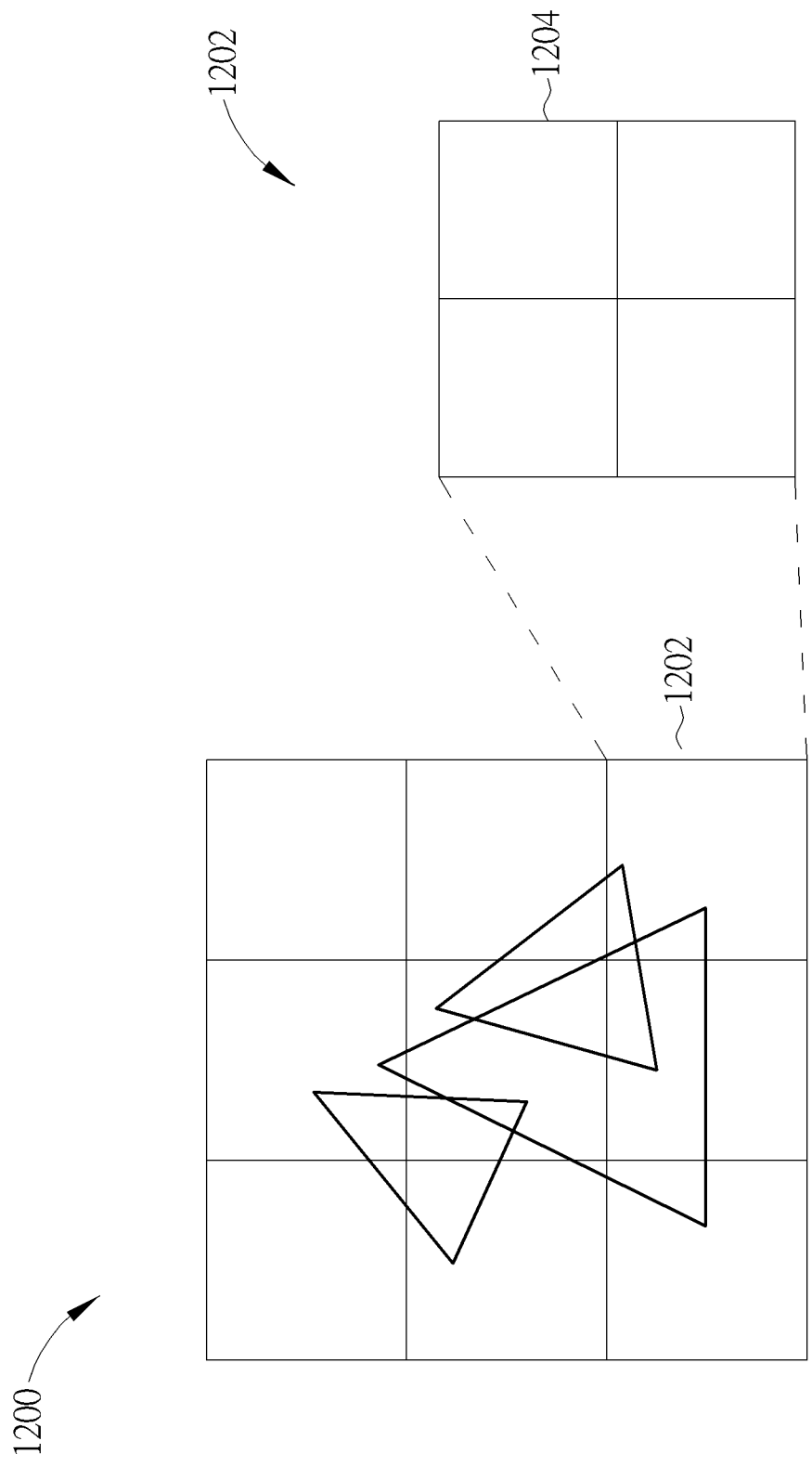
FIG. 12 is a diagram illustrating an operation of dividing one macro-bin into a plurality of micro-bins according to an embodiment of the present invention.

The vertex shader 102 processes vertices of primitives and store processed primitives into the bin buffer 1002. In this embodiment, the depth processing controller 1102 is configured to divide each bin (e.g., a macro-bin) of a screen space into small-sized bins (e.g., micro-bins), where each of the small-sized bins corresponding to one sub-region in the screen space. FIG. 12 is a diagram illustrating an operation of dividing one macro-bin into a plurality of micro-bins according to an embodiment of the present invention. As shown in FIG. 12, the screen space 1200 is originally divided into four bins (e.g., macro-bins) 1202. The depth processing controller 1102 further divides each of the bins (e.g., macro-bins) 1202 into four small-sized bins (e.g., micro-bins) 1204.

Figure 13:
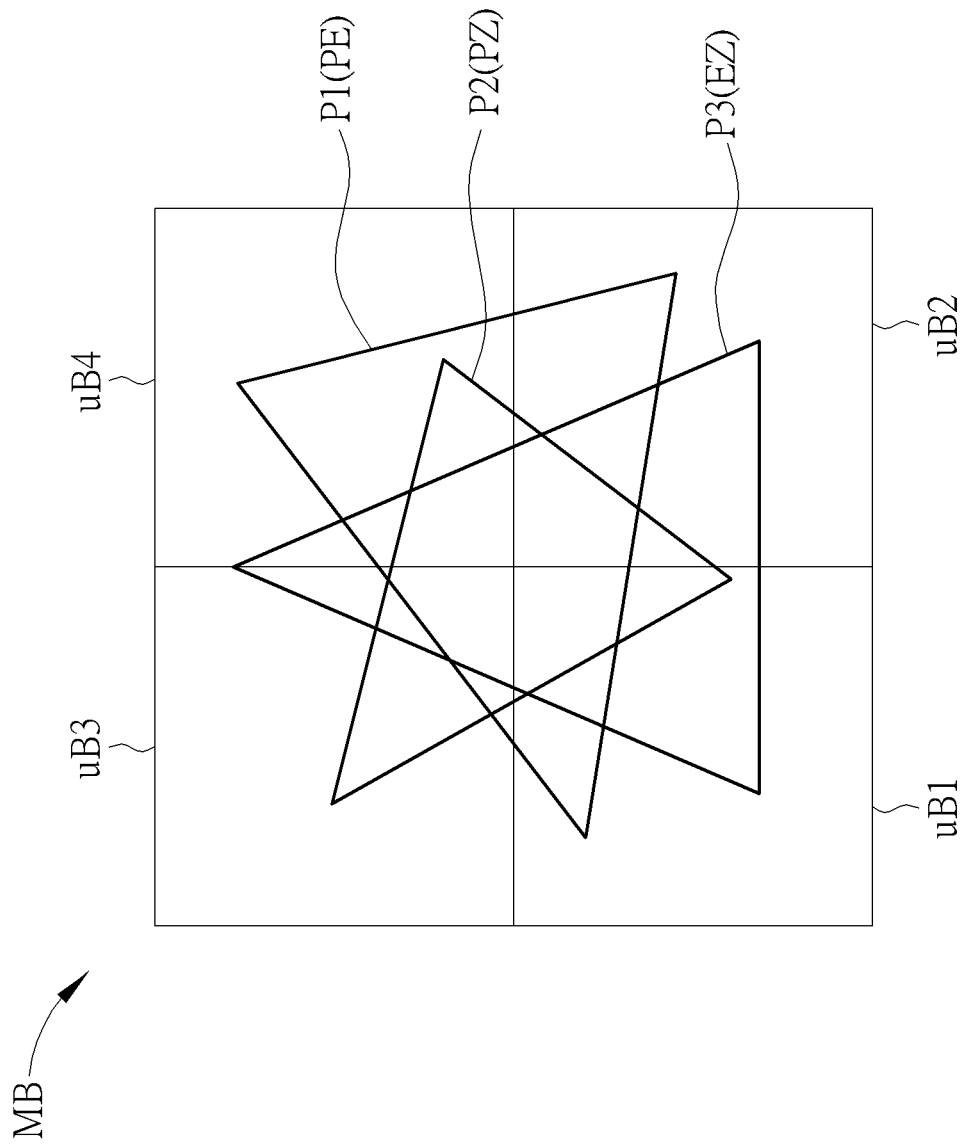
FIG. 13 is a diagram illustrating an example of a macro-bin subdivision according to an embodiment of the present invention.

In addition, the depth processing controller 1102 is configured to categorize each of primitives in a plurality of sub-regions of the screen space (e.g., micro-bins 1204 in the screen space 1200) as an early depth processing primitive or a post depth processing primitive, and dispatch the primitives in the sub-regions of the screen space to the following scan converter 103, where pixels generated by scan converter 103 for an early depth processing primitive will be controlled to undergo early depth processing performed in the early depth processing circuit 105, and pixels generated by scan converter 103 for a post depth processing primitive will be controlled to undergo post depth processing performed in the post depth processing circuit 107. FIG. 13 is a diagram illustrating an example of a macro-bin subdivision according to an embodiment of the present invention. In this example, the macro-bin MB is divided into four micro-bins uB1, uB2, uB3, and uB4. The triangle primitive P1 in the macro-bin MB may be categorized as a post depth processing primitive (which is denoted as P1(PZ)), the triangle primitive P2 in the macro-bin MB may be categorized as a post depth processing primitive (which is denoted as P2(PZ)), and the triangle primitive P3 in the macro-bin MB may be categorized as an early depth processing primitive (which is denoted as P3(EZ)).

In a conventional TBR design, primitives in the same macro-bin MB are dispatched one by one. For example, dispatching of vertex data of the post depth processing primitive P2(PZ) is not started until dispatching of all vertex data of the post depth processing primitive P1(PZ) is completed, and dispatching of vertex data of the early depth processing primitive P3(EZ) is not started until dispatching of all vertex data of the post depth processing primitive P2(PZ) is completed. When dispatching of primitives in the same macro-bin MB is switched from dispatching of post depth processing primitive(s) to dispatching of early depth processing primitive(s), there will be one waiting flush time prior to the start time of dispatching of early depth processing primitive(s), as illustrated in the sub-diagram (A) of FIG. 14.

In this embodiment, the depth processing controller 1102 divides each macro-bin into multiple micro-bins, and perform micro-bin based primitive dispatching scheduling to hide the waiting flush time in the primitive dispatching time. Concerning each primitive within a micro-bin, the depth processing controller 1102 may employ a conventional algorithm to categorize the primitive within the micro-bin as an early depth processing primitive or a post depth processing primitive. Taking the macro-bin MB shown in FIG. 13 for example, the depth processing controller 1102 determines that the micro-bin uB1 includes a post depth processing primitive uB1-P1(PZ) (which is a portion of the post depth processing primitive P1(PZ) within the micro-bin uB1), a post depth processing primitive uB1-P2(PZ) (which is a portion of the post depth processing primitive P2(PZ) within the micro-bin uB1), and an early depth processing primitive uB1-P3(EZ) (which is a portion of the early depth processing primitive P3(EZ) within the micro-bin uB1); determines that the micro-bin uB2 includes a post depth processing primitive uB2-P1(PZ) (which is a portion of the post depth processing primitive P1(PZ) within the micro-bin uB2), a post depth processing primitive uB2-P2(PZ) (which is a portion of the post depth processing primitive P2(PZ) within the micro-bin uB2), and an early depth processing primitive uB2-P3(EZ) (which is a portion of the early depth processing primitive P3(EZ) within the micro-bin uB2); determines that the micro-bin uB3 includes a post depth processing primitive uB3-P1(PZ) (which is a portion of the post depth processing primitive P1(PZ) within the micro-bin uB3), a post depth processing primitive uB3-P2(PZ) (which is a portion of the post depth processing primitive P2(PZ) within the micro-bin uB3), and an early depth processing primitive uB3-P3(EZ) (which is a portion of the early depth processing primitive P3(EZ) within the micro-bin uB3); and determines that the micro-bin uB4 includes a post depth processing primitive uB4-P1(PZ) (which is a portion of the post depth processing primitive P1(PZ) within the micro-bin uB4), a post depth processing primitive uB4-P2(PZ) (which is a portion of the post depth processing primitive P2(PZ) within the micro-bin uB4), and an early depth processing primitive uB4-P3(EZ) (which is a portion of the early depth processing primitive P3(EZ) within the micro-bin uB4)

When dispatching of primitives in a first sub-region of a screen space (e.g., one micro-bin in a macro-bin of the screen space) needs to switch from dispatching of at least one primitive each categorized as a post depth processing primitive to dispatching of at least one primitive each categorized as an early depth processing primitive, the depth processing controller 1102 is configured to start dispatching primitives in a second sub-region of the screen space (e.g., another micro-bin in the same macro-bin of the screen space) that is different from the first sub-region of the screen space. In this way, the waiting flush time needed for switching from post depth processing primitive dispatching to early depth processing primitive dispatching in one sub-region (e.g., one micro-bin) can be hidden in the primitive dispatching time of primitives in another sub-region (e.g., another micro-bin).

In one exemplary rendering design of the present invention, primitives in the same micro-bin are dispatched one by one. Taking dispatching of primitives in the micro-bin uB1 for example, the depth processing controller 1102 dispatches the post depth processing primitive uB1-P1(PZ), post depth processing primitive uB1-P2(PZ), and early depth processing primitive uB1-P3(EZ) one by one. Hence, dispatching of vertex data of the post depth processing primitive uB1-P2 (PZ) is not started until dispatching of all vertex data of the post depth processing primitive uB1-P1(PZ) is completed, and dispatching of vertex data of the early depth processing primitive uB1-P3(EZ) is not started until dispatching of all vertex data of the post depth processing primitive uB1-P2 (PZ) is completed. When dispatching of primitives in the same micro-bin uB1 is switched from dispatching of post depth processing primitive uB1-P2(PZ) to dispatching of early depth processing primitive uB1-P3(EZ), there will be one waiting flush time prior to the start time of dispatching of early depth processing primitive uB1-P3(EZ), as illustrated in the sub-diagram (B) of FIG. 14.

Similarly, when dispatching of primitives in the same micro-bin uB2 is switched from dispatching of post depth processing primitive uB2-P2(PZ) to dispatching of early depth processing primitive uB2-P3(EZ), there will be one waiting flush time prior to the start time of dispatching of early depth processing primitive uB2-P3(EZ); when dispatching of primitives in the same micro-bin uB3 is switched from dispatching of post depth processing primitive uB3-P2(PZ) to dispatching of early depth processing primitive uB3-P3(EZ), there will be one waiting flush time prior to the start time of dispatching of early depth processing primitive uB3-P3(EZ); and when dispatching of primitives in the same micro-bin uB4 is switched from dispatching of post depth processing primitive uB4-P2(PZ) to dispatching of early depth processing primitive uB4-P3(EZ), there will be one waiting flush time prior to the start time of dispatching of early depth processing primitives uB4-P3 (EZ).

Figure 14:
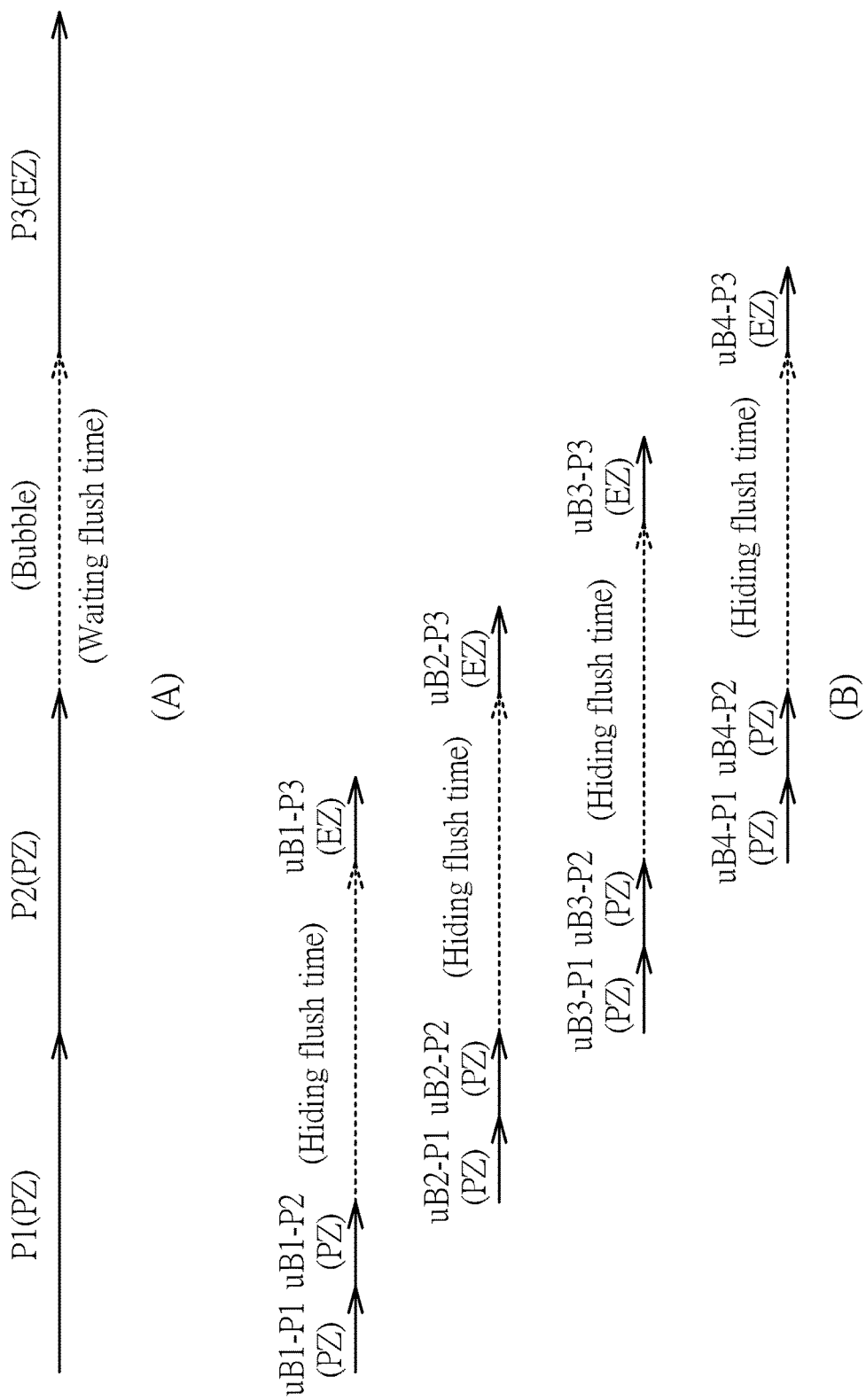
FIG. 14 is a diagram illustrating the conventional primitive dispatching scheduling operation and the proposed micro-bin based primitive dispatching scheduling operation.

However, as can be seen from the sub-diagram (B) of FIG. 14, the operation of dispatching post depth processing primitives uB2-P1(PZ), uB2-P2(PZ), uB3-P1(PZ), and uB3-P2(PZ) is performed during the waiting flush time prior to the start time of dispatching of early depth processing primitive uB1-P3(EZ); the operation of dispatching post depth processing primitives uB3-P1(PZ), uB3-P2(PZ), uB4-P1(PZ), and uB4-P2(PZ) is performed during the waiting flush time prior to the start time of dispatching of early depth processing primitive uB2-P3(EZ); the operation of dispatching post depth processing primitives uB4-P1(PZ) and uB4-P2(PZ) and early depth processing primitives uB1-P3(EZ) and uB2-P3(EZ) is performed during the waiting flush time prior to the start time of dispatching of early depth processing primitive uB3-P3(EZ); and the operation of dispatching early depth processing primitives uB2-P3(EZ) and uB3-P3 (EZ) is performed during the waiting flush time prior to the start time of dispatching of early depth processing primitive uB4-P3(EZ). Since the waiting flush time is hidden in the primitive dispatching time by the proposed primitive dispatching scheduling design, the performance of the TBR system can be improved.

In above embodiment, the depth processing controller 1102 is configured to perform the micro-bin based primitive dispatching scheduling to hide the waiting flush time in the primitive dispatching time. However, the same concept may be employed to realize bin/tile based primitive dispatching scheduling performed under the condition that no subdivision is applied to each bin/tile used in the TBR system to create small-sized bins/tiles (e.g., aforementioned micro-bins). In an alternative embodiment, the depth processing controller 1102 may be modified to perform bin based primitive dispatching scheduling to achieve the same objective of hiding the waiting flush time in the primitive dispatching time.

Figure 15:
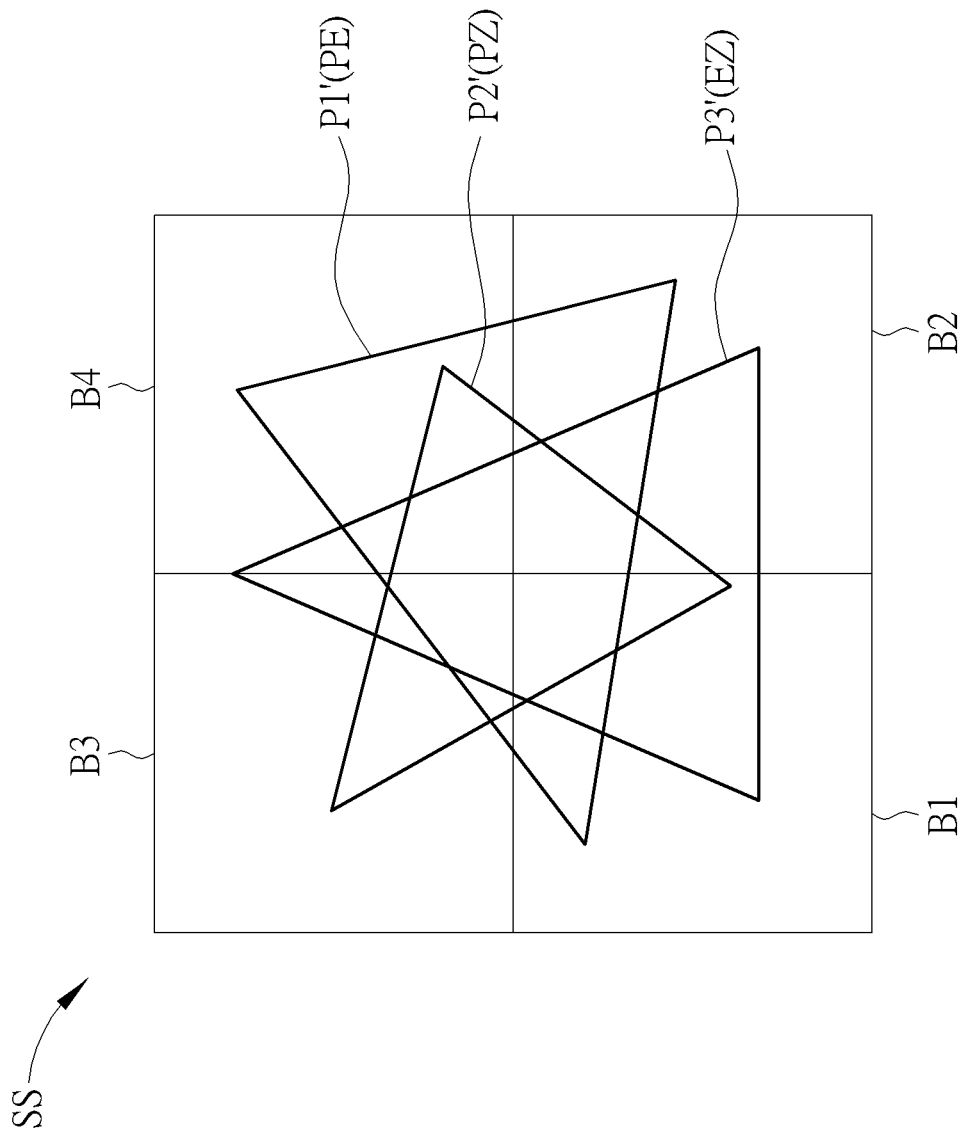
FIG. 15 is a diagram illustrating an example of a screen space subdivision according to an embodiment of the present invention.

FIG. 15 is a diagram illustrating an example of a screen space subdivision according to an embodiment of the present invention. In this example, the screen space SS is divided into four bins B1, B2, B3, and B4, each being a sub-region of the screen space SS. The triangle primitive P1' in the screen space SS may be categorized as a post depth processing primitive (which is denoted as P1'(PZ)), the triangle primitive P2' in the screen space SS may be categorized as a post depth processing primitive (which is denoted as P2'(PZ)), and the triangle primitive P3' in the screen space SS may be categorized as an early depth processing primitive (which is denoted as P3'(EZ)).

In this alternative embodiment, the depth processing controller 1102 divides the screen space into multiple bins, and performs bin based primitive dispatching scheduling to hide the waiting flush time in the primitive dispatching time. Concerning each primitive within a bin of the screen space, the depth processing controller 1102 may employ a conventional algorithm to categorize the primitive within the bin as an early depth processing primitive or a post depth processing primitive. Taking the screen space SS shown in FIG. 15 for example, the depth processing controller 1102 determines that the bin B1 includes a post depth processing primitive B1-P1'(PZ) (which is a portion of the post depth processing primitive P1'(PZ) within the bin B1), a post depth processing primitive B1-P2'(PZ) (which is a portion of the post depth processing primitive P2'(PZ) within the bin B1), and an early depth processing primitive B1-P3'(EZ) (which is a portion of the early depth processing primitive P3'(EZ) within the bin B1); determines that the bin B2 includes a post depth processing primitive B2-P1'(PZ) (which is a portion of the post depth processing primitive P1'(PZ) within the bin B2), a post depth processing primitive B2-P2'(PZ) (which is a portion of the post depth processing primitive P2'(PZ) within the bin B2), and an early depth processing primitive B2-P3'(EZ) (which is a portion of the early depth processing primitive P3'(EZ) within the bin B2); determines that the bin B3 includes a post depth processing primitive B3-P1'(PZ) (which is a portion of the post depth processing primitive P1'(PZ) within the bin B3), a post depth processing primitive B3-P2'(PZ) (which is a portion of the post depth processing primitive P2'(PZ) within the bin B3), and an early depth processing primitive B3-P3'(EZ) (which is a portion of the early depth processing primitive P3'(EZ) within the bin B3); and determines that the bin B4 includes a post depth processing primitive B4-P1'(PZ) (which is a portion of the post depth processing primitive P1'(PZ) within the bin B4), a post depth processing primitive B4-P2'(PZ) (which is a portion of the post depth processing primitive P2'(PZ) within the bin B4), and an early depth processing primitive B4-P3'(EZ) (which is a portion of the early depth processing primitive P3'(EZ) within the bin B4).

Figure 16:
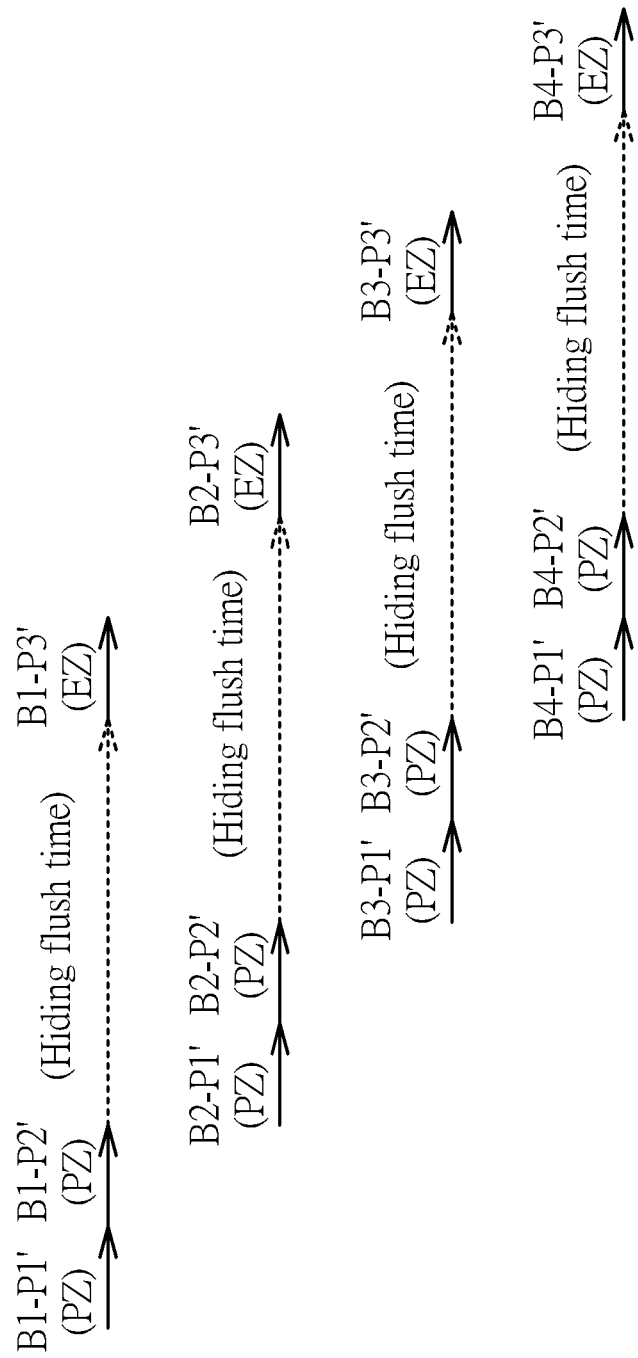
FIG. 16 is a diagram illustrating the proposed bin/tile based primitive dispatching scheduling operation.

When dispatching of primitives in a first sub-region of a screen space (e.g., one bin of the screen space) needs to switch from dispatching of at least one primitive each categorized as a post depth processing primitive to dispatching of at least one primitive each categorized as an early depth processing primitive, the depth processing controller 1102 is configured to start dispatching primitives in a second sub-region of the screen space (e.g., another bin in the same screen space) that is different from the first sub-region of the screen space. In this way, the waiting flush time needed for switching from post depth processing primitive dispatching to early depth processing primitive dispatching in one sub-region (e.g., one bin) can be hidden in the primitive dispatching time of primitives in another sub-region (e.g., another bin), as illustrated in FIG. 16.

As a person skilled in the art can easily understand technical features of the bin based primitive dispatching scheduling design after reading above paragraphs directed to the micro-bin based primitive dispatching scheduling design, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A depth processing apparatus, comprising:
   a depth buffer, configured to store depth information of a plurality of pixels of a screen space;
   an early depth processing circuit, configured to perform early depth processing based on at least a portion of the depth information in the depth buffer before a pixel shading stage;
   a post depth processing circuit, configured to perform post depth processing based on at least a portion of the depth information in the depth buffer after the pixel shading stage; and
   a depth processing controller, configured to manage a plurality of dependency indication values corresponding to a plurality of sub-regions in the screen space, respectively, and configured to control a first pixel for undergoing at least one of the early depth processing and the post depth processing by referring to a first dependency indication value of a first sub-region in which the first pixel is located, wherein each of the dependency indication values is configured to maintain data coherency between the early depth processing and the post depth processing of a corresponding sub-region in the screen space, and is adaptively adjusted based on occurrence of at least one pixel that is located in the corresponding sub-region and currently undergoes the post depth processing;
   wherein the first sub-region is one of the sub-regions in the screen space, and comprises a plurality of pixels including the first pixel; when the first sub-region has no pixel currently undergoing the post depth processing, the depth processing controller sets the first dependency indication value of the first sub-region by a first value; and when the first sub-region has at least one pixel currently undergoing the post depth processing, the depth processing controller sets the first dependency indication value of the first sub-region by a second value different from the first value.

2. The depth processing apparatus of claim 1, wherein the first pixel is controlled to undergo the post depth processing; and the depth processing controller is configured to add an adjustment value to the first dependency indication value in response to the post depth processing performed upon the first pixel, and subtract the adjustment value from the first dependency indication value in response to a completion of the post depth processing performed upon the first pixel.

3. The depth processing apparatus of claim 1, wherein the first pixel is controlled to undergo the early depth processing; and the depth processing controller is configured to not adjust the first dependency indication value in response to the early depth processing performed upon the first pixel.

4. The depth processing apparatus of claim 1, wherein the first pixel is categorized as an early depth processing pixel; and when the first dependency indication value indicates that there is no dependency between the early depth processing and the post depth processing of the first sub-region, the depth processing controller is configured to control the first pixel to undergo the early depth processing only.

5. The depth processing apparatus of claim 1, wherein the first pixel is categorized as an early depth processing pixel; and when the first dependency indication value indicates that there is dependency between the early depth processing and the post depth processing of the first sub-region, the depth processing controller is configured to control the first pixel to undergo at least the post depth processing.

6. The depth processing apparatus of claim 1, wherein the first pixel is categorized as an early depth processing pixel; and when the first dependency indication value indicates that there is dependency between the early depth processing and the post depth processing of the corresponding sub-region, the depth processing controller is configured to control the first pixel to wait for the first dependency indication value indicating that there is no dependency between the early depth processing and the post depth processing of the corresponding sub-region, where the first pixel does not undergo the early depth processing until the first dependency indication value indicates that there is no dependency between the early depth processing and the post depth processing of the corresponding sub-region.

7. The depth processing apparatus of claim 6, wherein a second pixel after the first pixel is categorized as an early depth processing pixel; and when a second dependency indication value of a second sub-region in which the second pixel is located indicates that there is no dependency between the early depth processing and the post depth processing of the second sub-region, the early depth processing circuit is configured to apply the early depth processing to the first pixel and the second processing out of order.

8. A depth processing method, comprising:
   storing depth information of a plurality of pixels of a screen space in a depth buffer;
   selectively performing early depth processing based on at least a portion of the depth information in the depth buffer before a pixel shading stage;
   selectively performing post depth processing based on at least a portion of the depth information in the depth buffer after the pixel shading stage;
   managing a plurality of dependency indication values corresponding to a plurality of sub-regions in the screen space, respectively; and
   controlling a first pixel for undergoing at least one of the early depth processing and the post depth processing by referring to a first dependency indication value of a first sub-region in which the first pixel is located;
   wherein each of the dependency indication values is configured to maintain data coherency between the early depth processing and the post depth processing of a corresponding sub-region in the screen space, and is adaptively adjusted based on occurrence of at least one pixel that is located in the corresponding sub-region and currently undergoes the post depth processing;
   wherein the first sub-region is one of the sub-regions in the screen space, and comprises a plurality of pixels including the first pixel; when the first sub-region has no pixel currently undergoing the post depth processing, the first dependency indication value of the first sub-region is set by a first value; and when the first sub-region has at least one pixel currently undergoing the post depth processing, the first dependency indication value of the first sub-region is set by a second value different from the first value.

9. The depth processing method of claim 8, wherein the first pixel is controlled to undergo the post depth processing; and managing the dependency indication values corresponding to the sub-regions in the screen space comprises:
   adding an adjustment value to the first dependency indication value in response to the post depth processing performed upon the first pixel; and
   subtracting the adjustment value from the first dependency indication value in response to a completion of the post depth processing performed upon the first pixel.

10. The depth processing method of claim 8, wherein the first pixel is controlled to undergo the early depth processing; and managing the dependency indication values corresponding to the sub-regions in the screen space comprises:
    not adjusting the first dependency indication value in response to the early depth processing performed upon the first pixel.

11. The depth processing method of claim 8, wherein the first pixel is categorized as an early depth processing pixel; and when the first dependency indication value indicates that there is no dependency between the early depth processing and the post depth processing of the first sub-region, the depth processing controller is configured to control the first pixel to undergo the early depth processing only.

12. The depth processing method of claim 8, wherein the first pixel is categorized as an early depth processing pixel; and referring to the first dependency indication value of the first sub-region in which the first pixel is located to control the first pixel to undergo at least one of the early depth processing and the post depth processing comprises:
    when the first dependency indication value indicates that there is dependency between the early depth processing and the post depth processing of the first sub-region, controlling the first pixel to undergo at least the post depth processing.

13. The depth processing method of claim 8, wherein the first pixel is categorized as an early depth processing pixel; and referring to the first dependency indication value of the first sub-region in which the first pixel is located to control the first pixel to undergo at least one of the early depth processing and the post depth processing comprises:
    when the first dependency indication value indicates that there is dependency between the early depth processing and the post depth processing of the corresponding sub-region, controlling the first pixel to wait for the first dependency indication value indicating that there is no dependency between the early depth processing and the post depth processing of the corresponding sub-region, where the first pixel does not undergo the early depth processing until the first dependency indication value indicates that there is no dependency between the early depth processing and the post depth processing of the corresponding sub-region.

14. The depth processing method of claim 13, wherein a second pixel after the first pixel is categorized as an early depth processing pixel; and the depth processing method further comprises:
    when a second dependency indication value of a second sub-region in which the second pixel is located indicates that there is no dependency between the early depth processing and the post depth processing of the second sub-region, applying the early depth processing to the first pixel and the second processing out of order.

* * * * *